US009922188B2

United States Patent
Thibadeau, Sr. et al.

(10) Patent No.: US 9,922,188 B2
(45) Date of Patent: *Mar. 20, 2018

(54) METHOD AND SYSTEM OF PROVIDING A PICTURE PASSWORD FOR RELATIVELY SMALLER DISPLAYS

(71) Applicants: Robert H. Thibadeau, Sr., Pittsburgh, PA (US); Justin D. Donnell, Verona, PA (US); Robert Thibadeau, Jr., Decatur, GA (US)

(72) Inventors: Robert H. Thibadeau, Sr., Pittsburgh, PA (US); Justin D. Donnell, Verona, PA (US); Robert Thibadeau, Jr., Decatur, GA (US)

(73) Assignee: Antique Books, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,045

(22) Filed: Jan. 18, 2017

(65) Prior Publication Data

US 2017/0132402 A1 May 11, 2017

Related U.S. Application Data

(63) Continuation of application No. 15/069,635, filed on Mar. 14, 2016, now Pat. No. 9,582,106, which is a
(Continued)

(51) Int. Cl.
*G06F 7/04* (2006.01)
*H04L 9/32* (2006.01)
(Continued)

(52) U.S. Cl.
CPC .......... *G06F 21/36* (2013.01); *G06F 3/04847* (2013.01); *G06F 3/04883* (2013.01); *G06F 2203/04808* (2013.01)

(58) Field of Classification Search
CPC .. G06F 21/36; G06F 3/04847; G06F 3/04883; G06F 2203/04808
(Continued)

(56) References Cited

U.S. PATENT DOCUMENTS 5,559,961 A   9/1996   Blonder
6,209,104 B1  3/2001   Jalili
(Continued)

FOREIGN PATENT DOCUMENTS

EP   1601153 A2   11/2005
EP   2085908 A2    8/2009
(Continued)

OTHER PUBLICATIONS

Author Unknown, "Human Verification," retrieved on Apr. 22, 2015 from graphicdesign.stackexchange.com, 1 page.
(Continued)

*Primary Examiner* — Aravind Moorthy
(74) *Attorney, Agent, or Firm* — Withrow & Terranova, PLLC

(57) ABSTRACT

Embodiments described herein relate to a device operable to process input for a picture password for proof of knowledge. In some embodiments, the device includes a display, an input subsystem, processor(s), and memory containing instructions executable by the processor(s) such that the device is operative to display, on the display of the device, an image for the picture password proof of knowledge. The image is associated with an overlaid grid comprising a plurality of elements, and each element corresponds to a distinct area of the image. The device is further operative to, determine an offset to be used and, in response to receiving an input via the input subsystem at a first location of the display, highlight an element of the overlaid grid at a second location on the first image on the display. The second location is offset from the first location by the offset.

25 Claims, 22 Drawing Sheets

Related U.S. Application Data continuation of application No. 14/728,902, filed on Jun. 2, 2015, now Pat. No. 9,323,435, which is a continuation-in-part of application No. 14/693,121, filed on Apr. 22, 2015, now Pat. No. 9,300,659.

(60) Provisional application No. 62/006,466, filed on Jun. 2, 2014, provisional application No. 62/025,141, filed on Jul. 16, 2014, provisional application No. 61/982,375, filed on Apr. 22, 2014.

(51) Int. Cl.
    *G06F 21/00* (2013.01)
    *G06F 21/36* (2013.01)
    *G06F 3/0488* (2013.01)
    *G06F 3/0484* (2013.01)

(58) Field of Classification Search
    USPC .............................. 726/18, 5; 713/168, 182
    See application file for complete search history.

(56) References Cited

U.S. PATENT DOCUMENTS

| | | | |
|---|---|---|---|
| 6,249,868 B1 | 6/2001 | Sherman et al. | |
| 6,411,283 B1 | 6/2002 | Murphy | |
| 6,658,328 B1 | 12/2003 | Alrabady et al. | |
| 6,934,860 B1 | 8/2005 | Goldstein | |
| 6,983,065 B1 | 1/2006 | Akgul et al. | |
| 7,243,239 B2 | 7/2007 | Kirovski et al. | |
| 7,370,351 B1 | 5/2008 | Ramachandran et al. | |
| 7,734,930 B2 | 6/2010 | Kirovski et al. | |
| 8,015,563 B2 | 9/2011 | Araujo, Jr. et al. | |
| 8,024,775 B2 | 9/2011 | Xu et al. | |
| 8,155,622 B1 | 4/2012 | Moshenberg et al. | |
| 8,191,126 B2 | 5/2012 | Raghavan | |
| 8,353,016 B1 | 1/2013 | Pravetz et al. | |
| 8,392,975 B1 | 3/2013 | Raghunath | |
| 8,627,421 B1 | 1/2014 | Bowers et al. | |
| 8,667,560 B2 | 3/2014 | Albisu | |
| 8,682,802 B1 | 3/2014 | Kannanari | |
| 8,813,183 B2 | 8/2014 | Thibadeau et al. | |
| 8,813,247 B1 | 8/2014 | Alten | |
| 8,832,804 B1 | 9/2014 | Casey et al. | |
| 8,881,251 B1 | 11/2014 | Hilger | |
| 8,918,851 B1 | 12/2014 | Iannamico | |
| 8,966,268 B2 | 2/2015 | Marien | |
| 9,300,659 B2 | 3/2016 | Thibadeau, Sr. et al. | |
| 9,323,435 B2 | 4/2016 | Thibadeau, Sr. et al. | |
| 9,582,106 B2 * | 2/2017 | Thibadeau, Sr. ... G06F 3/04842 | |
| 2002/0029341 A1 | 3/2002 | Juels et al. | |
| 2002/0080123 A1 | 6/2002 | Kennedy et al. | |
| 2002/0196274 A1 | 12/2002 | Comfort et al. | |
| 2003/0147536 A1 | 8/2003 | Andivahis et al. | |
| 2004/0010721 A1 | 1/2004 | Kirovski et al. | |
| 2004/0030934 A1 | 2/2004 | Mizoguchi et al. | |
| 2004/0034801 A1 | 2/2004 | Jaeger | |
| 2004/0073809 A1 | 4/2004 | Wing Keong | |
| 2004/0095384 A1 | 5/2004 | Avni et al. | |
| 2004/0230843 A1 | 11/2004 | Jansen | |
| 2006/0206717 A1 | 9/2006 | Holt et al. | |
| 2006/0244735 A1 | 11/2006 | Wilson | |
| 2007/0005962 A1 | 1/2007 | Baker | |
| 2007/0067631 A1 | 3/2007 | Westhoff | |
| 2007/0097096 A1 | 5/2007 | Rosenberg | |
| 2007/0150842 A1 | 6/2007 | Chaudhri et al. | |
| 2007/0229216 A1 | 10/2007 | Yasuda | |
| 2008/0010678 A1 | 1/2008 | Burdette et al. | |
| 2008/0022129 A1 | 1/2008 | Durham et al. | |
| 2008/0163055 A1 | 7/2008 | Ganz et al. | |
| 2008/0201578 A1 | 8/2008 | Drake | |
| 2008/0263361 A1 | 10/2008 | Dutta et al. | |
| 2009/0089869 A1 | 4/2009 | Varghese | |
| 2009/0106134 A1 | 4/2009 | Royyuru | |
| 2009/0158424 A1 | 6/2009 | Yang | |
| 2009/0160800 A1 | 6/2009 | Liu et al. | |
| 2009/0199002 A1 | 8/2009 | Erickson | |
| 2009/0202153 A1 | 8/2009 | Cortopassi et al. | |
| 2009/0313693 A1 | 12/2009 | Rogers | |
| 2010/0043062 A1 | 2/2010 | Alexander et al. | |
| 2010/0146128 A1 | 6/2010 | Kulkarni et al. | |
| 2010/0169958 A1 | 7/2010 | Werner et al. | |
| 2010/0207721 A1 | 8/2010 | Nakajima et al. | |
| 2010/0223326 A1 | 9/2010 | Noldus et al. | |
| 2011/0013031 A1 | 1/2011 | Miyasako | |
| 2011/0055585 A1 | 3/2011 | Lee | |
| 2011/0081640 A1 | 4/2011 | Tseng et al. | |
| 2011/0099203 A1 | 4/2011 | Fastring | |
| 2011/0162067 A1 | 6/2011 | Shuart et al. | |
| 2011/0191592 A1 | 8/2011 | Goertzen | |
| 2011/0197259 A1 | 8/2011 | Thibadeau et al. | |
| 2011/0202982 A1 | 8/2011 | Alexander et al. | |
| 2012/0005483 A1 | 1/2012 | Patvarczki et al. | |
| 2012/0011564 A1 | 1/2012 | Osborn et al. | |
| 2012/0054833 A1 | 3/2012 | Albisu | |
| 2012/0084869 A1 | 4/2012 | Bilaney et al. | |
| 2012/0167199 A1 | 6/2012 | Riddiford | |
| 2012/0175412 A1 | 7/2012 | Grabiner et al. | |
| 2012/0304284 A1 | 11/2012 | Johnson et al. | |
| 2013/0031623 A1 | 1/2013 | Sanders | |
| 2013/0042303 A1 | 2/2013 | Chow et al. | |
| 2013/0043914 A1 | 2/2013 | Gelman | |
| 2013/0047236 A1 | 2/2013 | Singh | |
| 2013/0097697 A1 | 4/2013 | Zhu et al. | |
| 2013/0104197 A1 | 4/2013 | Nandakumar | |
| 2013/0111581 A1 | 5/2013 | Griffin et al. | |
| 2013/0179954 A1 | 7/2013 | Bidare | |
| 2013/0201106 A1 | 8/2013 | Naccache | |
| 2013/0268775 A1 | 10/2013 | Hawkins | |
| 2013/0340057 A1 | 12/2013 | Kitlyar | |
| 2014/0006512 A1 | 1/2014 | Huang et al. | |
| 2014/0023279 A1 | 1/2014 | Fahn et al. | |
| 2014/0028554 A1 | 1/2014 | De Los Reyes et al. | |
| 2014/0181956 A1 | 6/2014 | Ahn et al. | |
| 2014/0201831 A1 | 7/2014 | Yi et al. | |
| 2014/0233740 A1 | 8/2014 | Niamut et al. | |
| 2014/0282961 A1 | 9/2014 | Dorfman et al. | |
| 2014/0320420 A1 | 10/2014 | Ida et al. | |
| 2014/0331057 A1 | 11/2014 | Thibadeau et al. | |
| 2014/0359653 A1 | 12/2014 | Thorpe et al. | |
| 2014/0373132 A1 | 12/2014 | Basmov et al. | |
| 2015/0033306 A1 | 1/2015 | Dickenson et al. | |
| 2015/0138584 A1 | 5/2015 | Tsongas et al. | |
| 2015/0180902 A1 | 6/2015 | Biswas et al. | |
| 2015/0301724 A1 | 10/2015 | Thibadeau, Sr. et al. | |
| 2015/0304303 A1 | 10/2015 | Thibadeau, Sr. et al. | |
| 2015/0310188 A1 | 10/2015 | Ford et al. | |
| 2015/0349957 A1 | 12/2015 | Thibadeau, Sr. et al. | |
| 2015/0350210 A1 | 12/2015 | Thibadeau, Sr. et al. | |
| 2016/0044021 A1 | 2/2016 | Thibadeau, Sr. et al. | |
| 2016/0050198 A1 | 2/2016 | Thibadeau, Sr. et al. | |
| 2016/0195995 A1 | 7/2016 | Thibadeau, Sr. et al. | |

FOREIGN PATENT DOCUMENTS

| | | |
|---|---|---|
| EP | 2775416 A2 | 9/2014 |
| GB | 2504746 A | 2/2014 |
| RU | 2013113592 A | 10/2014 |
| WO | 03048909 A2 | 6/2003 |
| WO | 2009039223 A1 | 3/2009 |
| WO | 2011014878 A1 | 2/2011 |
| WO | 2011100017 A1 | 8/2011 |
| WO | 2013003535 A1 | 1/2013 |
| WO | 2014165431 A1 | 10/2014 |

OTHER PUBLICATIONS

Author Unknown, "OpenID Authentication 2.0—Final," Openid. net, Dec. 5, 2007, retrieved on Jan. 1, 2013 from http://openid.net/specs/openid-authentication-2_0.html#http_encoding, 34 pages.

Author Unknown, "Security Assertion Markup Language (SAML) V2.0 Technical Overview," OASIS, Mar. 25, 2008, retrieved on Apr.

(56) References Cited

OTHER PUBLICATIONS 14, 2010 from http://docs.oasis-open.org/security/saml/Post2.0/sstc-saml-tech-overview-2.0-cd-02.pdf, 51 pages.

Beideman, Calvin et al., "Set Families with Low Pairwise Intersection," Apr. 17, 2014, retrieved Jan. 15, 2015 from http://www.cs.cmu.edu/~jblocki/, 12 pages.

Blocki, Jeremiah et al., "Adaptive Regret Minimization in Bounded-Memory Games," Decision and Game Theory for Security: Proceedings of the 4th International Conference on Decision and Game Theory for Security (GameSec), Nov. 11-12, 2013, Fort Worth, TX, Springer International Publishing, pp. 65-84, retrieved Jan. 15, 2015 from http://www.cs.cmu.edu/~jblocki/, 19 pages.

Blocki, Jeremiah et al., "Adaptive Regret Minimization in Bounded-Memory Games," Presentation Slides, retrieved Jan. 15, 2015 from http://www.cs.cmu.edu/~jblocki/, 61 pages.

Blocki, Jeremiah et al., "Audit Games," Proceedings of the 23rd International Joint Conference on Artificial Intelligence, Aug. 3-9, 2013, Beijing, China, AAAI Press, pp. 41-47.

Blocki, Jeremiah et al., "Audit Games with Multiple Defender Resources," retrieved Jan. 15, 2015 from http://www.cs.cmu.edu/~jblocki/, 11 pages.

Blocki, Jeremiah et al., "Audit Mechanisms for Provable Risk Management and Accountable Data Governance," Decision and Game Theory for Security: Proceedings of the 3rd International Conference on Decision and Game Theory for Security (GameSec), Budapest, Hungary, Nov. 5-6, 2012, Springer Berlin Heidelberg, pp. 38-59, retrieved Jan. 15, 2015 from http://www.cs.cmu.edu/~jblocki/, 27 pages.

Blocki, Jeremiah et al., "Audit Mechanisms for Privacy Protection in Healthcare Environments," Proceedings of the 2nd USENIX Conference on Health Security and Privacy (HealthSec'11), Aug. 8-12, 2011, San Francisco, CA, USENIX Association, p. 10, retrieved Jan. 15, 2015 from http://www.cs.cmu.edu/~jblocki/, 2 pages.

Blocki, Jeremiah et al., "Differentially Private Data Analysis of Social Networks via Restricted Sensitivity," Proceedings of the 4th Conference on Innovations in Theoretical Computer Science (ITCS '13), Jan. 10-12, 2013, Berkely, CA, ACM, pp. 87-96, retrieved Jan. 15, 2015 from http://arxiv.org/abs/1208.4586v2, 19 pages.

Blocki, Jeremiah et al., "Differentially Private Data Analysis of Social Networks via Restricted Sensitivity," Presentation Slides, Fall 2012, retrieved Jan. 15, 2015 from http://www.cs.cmu.edu/~jblocki/, 94 pages.

Blocki, Jeremiah, "Senior Research Thesis: Direct Zero-Knowledge Proofs," May 1, 2009, retrieved Jan. 15, 2015 from http://www.cs.cmu.edu/~jblocki/, 16 pages.

Blocki, Jeremiah et al., "Gotcha Password Hackers!" Proceedings of the 2013 ACM Workshop on Artificial Intelligence and Security (AISec '13), Nov. 4-8, 2013, Berlin, Germany, ACM, 12 pages.

Blocki, Jeremiah et al., "Gotcha Password Hackers!" Presentation Slides, retrieved Jan. 15, 2015 from http://www.cs.cmu.edu/~jblocki/, 38 pages.

Blocki, Jeremiah et al., "Human Computable Passwords," Oct. 2, 2014, retrieved Jan. 15, 2015 from http://www.cs.cmu.edu/~jblocki/, 43 pages.

Blocki, Jeremiah et al., "Human Computable Passwords," Presentation Slides, Fall 2014, retrieved Jan. 15, 2015 from http://www.cs.cmu.edu/~jblocki/, 111 pages.

Blocki, Jeremiah et al., "The Johnson-Lindenstrauss Transform Itself Preserves Differential Privacy," Proceedings of the 2012 IEEE 53rd Annual Symposium on Foundations of Computer Science (FOCS), Oct. 20-23, 2012, New Brunswick, NJ, IEEE Computer Society, pp. 410-419, retrieved Jan. 15, 2015 from http://www.cs.cmu.edu/~jblocki/, 27 pages.

Blocki, Jeremiah et al., "Naturally Rehearsing Passwords," Advances in Cryptology—ASIACRYPT 2013: Proceedings of the 19th International Conference on the Theory and Application of Cryptology and Information Security, Part II, Bengalaru, India, Dec. 1-5, 2013 Springer Berlin Heidelberg, pp. 361-380, retrieved Jan. 15, 2015 from http://www.cs.cmu.edu/~jblocki/, 34 pages.

Blocki, Jeremiah et al., "Optimizing Password Composition Policies," Proceedings of the 14th ACM Conference on Electronic Commerce, Jun. 16-20, 2013, Philadelphia, PA, ACM, pp. 105-122, retrieved Jan. 15, 2015 from http://www.cs.cmu.edu/~jblocki/, 27 pages.

Blocki, Jeremiah, "Usable and Secure Password Management," Presentation Slides, Spring 2012, retrieved Jan. 15, 2015 from http://www.cs.cmu.edu/~jblocki/, 75 pages.

Blocki, Jeremiah et al., "Regret Minimizing Audits: A Learning-theoretic Basis for Privacy Protection," 2011 IEEE 24th Computer Security Foundations Symposium (CSF), Jun. 27-29, 2011, Cernay-la-Ville, France, IEEE, pp. 312-327, retrieved Jan. 15, 2015 from http://www.cs.cmu.edu/~jblocki/, 16 pages.

Blocki, Jeremiah et al., "Resolving the Complexity of Some Data Privacy Problems," Automata, Languages and Programming: Proceedings of the 37th International Colloquium Conference on Automata, Languages and Programming (ICALP 2010), Jul. 6-10, 2010, Bordeaux, France, Springer Berlin Heidelberg, pp. 393-404, retrieved Jan. 15, 2015 from http://www.cs.cmu.edu/~jblocki/, 18 pages.

Blocki, Jeremiah et al., "Resolving the Complexity of Some Data Privacy Problems," Presentation Slides, 2010, retrieved Jan. 15, 2015 from http://www.cs.cmu.edu/~jblocki/, 36 pages.

Blocki, Jeremiah et al., "Spaced Repetition and Mnemonics Enable Recall of Multiple Strong Passwords," Oct. 6, 2014, retrieved Jan. 15, 2015 from http://www.cs.cmu.edu/~jblocki/, 16 pages.

Blocki, Jeremiah, "Usable Human Authentication: A Quantitative Treatment," Doctoral Thesis, Jun. 30, 2014, retrieved Jan. 15, 2015 from http://www.cs.cmu.edu/~jblocki/, 262 pages.

Dunphy, Paul et al., "Do Background Images Improve "Draw a Secret" Graphical Passwords?" Proceedings of the 14th ACM Conference on Computer and Communications Security (CCS '07), Oct. 29-Nov. 2, 2007, Alexandria, Virginia, ACM, pp. 36-47.

Hughes, Neil, "Future iPhones, iPads could recognize, adjust for individual users," AppleInsider, Aug. 19, 2010, 4 pages, http://appleinsider.com/articles/10/08/19/future_iphones_ipads_could_recognize_adjust_for_individual_users.

Jansen, Wayne et al., "Picture Password: A Visual Login Technique for Mobile Devices," National Institute of Standards and Technology, NISTIR 7030, Jul. 2003, 20 pages.

Pace, Zach, "Signing in with a picture password," http://blogs.msdn.com/b/b8/archive/2011/12/16/signing-in-with-a-picture-password.aspx, Dec. 16, 2011, 9 pages.

Scavo, T. et al., "Shibboleth Architecture," Jun. 8, 2005, retrieved on Jun. 20, 2014 from http:/open-systems.ufl.edu/files/draft-mace-shibboleth-tech-overview-latest.pdf, 31 pages.

Thibadeau, Robert et al., "Proofs of Knowledge on the Web: A New Framework for Password Identification and Capacity to Make Decisions," 2014-NIST-NSTIC-01 Abbreviated Proposal, Bright Plaza, Inc., Philadelphia, Mar. 2, 2014, 5 pages.

Zhao, Ziming et al., "On the Security of Picture Gesture Authentication," 22nd USENIX Security Symposium, Aug. 14-16, 2013, Washington, D.C., pp. 383-398.

International Search Report for PCT/US10/58825, dated Feb. 2, 2011, 2 pages.

Written Opinion of the International Searching Authority for PCT/US10/58825, dated Feb. 2, 2011, 4 pages.

International Preliminary Report on Patentability for PCT/US10/58825, dated May 23, 2012, 3 pages.

International Search Report and Written Opinion for PCT/US2014/032342, dated Jul. 4, 2014, 14 pages.

Written Opinion of the International Searching Authority for PCT/US2014/032342, dated Mar. 17, 2015, 6 pages.

International Preliminary Report on Patentability for PCT/US2014/032342, dated Jun. 24, 2015, 23 pages.

Extended European Search Report for European Patent Application No. 10845949.6, dated Oct. 9, 2014, 7 pages.

Non-Final Office Action for U.S. Appl. No. 12/884,478, dated Dec. 12, 2012, 15 pages.

Final Office Action for U.S. Appl. No. 12/884,478, dated May 20, 2013, 19 pages.

(56) References Cited

OTHER PUBLICATIONS

Advisory Action for U.S. Appl. No. 12/884,478, dated Sep. 9, 2013, 3 pages.
Notice of Allowance and Examiner-Initiated Interview Summary for U.S. Appl. No. 12/884,478, dated Apr. 4, 2014, 10 pages.
Non-Final Office Action for U.S. Appl. No. 14/330,986, dated Dec. 16, 2014, 18 pages.
Final Office Action for U.S. Appl. No. 14/330,986, dated Apr. 27, 2015, 20 pages.
Advisory Action and Examiner Initiated Interview for U.S. Appl. No. 14/330,986, dated Jul. 14, 2015, 3 pages.
Invitation to Pay Additional Fees and Partial International Search Report for PCT/US2015/027040, dated Jul. 24, 2015, 7 pages.
Non-Final Office Action for U.S. Appl. No. 14/782,257, dated Mar. 9, 2017, 6 pages.
Non-Final Office Action for U.S. Appl. No. 15/295,718, dated Mar. 9, 2017, 14 pages.
Non-Final Office Action for U.S. Appl. No. 14/693,121, dated Aug. 6, 2015, 16 pages.
Non-Final Office Action for U.S. Appl. No. 14/728,902, dated Aug. 26, 2015, 15 pages.
Invitation to Pay Additional Fees and Partial International Search Report for PCT/US2015/033823, dated Aug. 14, 2015, 7 pages.
International Search Report and Written Opinion for PCT/US2015/033830, dated Aug. 24, 2015, 11 pages.
Non-Final Office Action for U.S. Appl. No. 14/330,986, dated Sep. 15, 2015, 16 pages.
Non-Final Office Action for U.S. Appl. No. 14/728,759, dated Sep. 10, 2015, 15 pages.
International Search Report and Written Opinion for PCT/US2015/033811, dated Sep. 21, 2015, 10 pages.
International Search Report and Written Opinion for PCT/US2015/044694, dated Oct. 2, 2015, 10 pages.
Author Unknown, "Cognitive test," Wikipedia.com, last modified Oct. 28, 2014, retrieved on Nov. 11, 2015, 3 pages, https://en.wikipedia.org/w/index.php?title=Cognitive_test&oldid=631463869.
Author Unknown, "James McKeen Cattell," Wikipedia.com, last modified Sep. 9, 2015, retrieved on Nov. 11, 2015, 5 pages, https://en.wikipedia.org/wiki/James_McKeen_Cattell.
International Search Report and Written Opinion for PCT/US2015/027040, dated Nov. 20, 2015, 21 pages.
International Search Report and Written Opinion for PCT/US2015/033823, dated Dec. 2, 2015, 18 pages.
Final Office Action for U.S. Appl. No. 14/330,986, dated Feb. 4, 2016, 18 pages.
Advisory Action for U.S. Appl. No. 14/330,986, dated May 2, 2016, 3 pages.
Notice of Allowance for U.S. Appl. No. 14/693,121, dated Jan. 22, 2016, 7 pages.
Final Office Action for U.S. Appl. No. 14/728,902, dated Jan. 29, 2016, 6 pages.
Notice of Allowance for U.S. Appl. No. 14/728,902, dated Mar. 11, 2016, 7 pages.
Non-Final Office Action for U.S. Appl. No. 14/728,904, dated Jan. 25, 2016, 15 pages.
Final Office Action for U.S. Appl. No. 14/728,759, dated Feb. 1, 2016, 17 pages.
Non-Final Office Action for U.S. Appl. No. 14/823,739, dated Nov. 30, 2015, 17 pages.
Final Office Action for U.S. Appl. No. 14/823,739, dated Apr. 28, 2016, 10 pages.
Menezes, A. et al., "Identification and Entity Authentication," Handbook of Applied Cryptography, CRC Press, 1997, pp. 385-424.
International Preliminary Report on Patentability for PCT/US2015/027040, dated Nov. 3, 2016, 15 pages.
International Preliminary Report on Patentability for PCT/US2015/033823, dated Nov. 3, 2016, 12 pages.
International Search Report and Written Opinion for PCT/US2016/020670, dated May 12, 2016, 11 pages.
International Search Report and Written Opinion for PCT/US2016/033793, dated Jul. 22, 2016, 11 pages.
Examination Report for European Patent Application No. 10845949.6, dated Jun. 13, 2016, 6 pages.
Examiner's Answer to the Appeal Brief for U.S. Appl. No. 14/330,986, dated Dec. 7, 2016, 21 pages.
Non-Final Office Action for U.S. Appl. No. 15/069,635, dated Jun. 16, 2016, 6 pages.
Notice of Allowance for U.S. Appl. No. 15/069,635, dated Oct. 18, 2016, 7 pages.
Notice of Allowance for U.S. Appl. No. 14/728,904, dated Jul. 1, 2016, 12 pages.
Corrected Notice of Allowability for U.S. Appl. No. 14/728,904, dated Aug. 10, 2016, 9 pages.
Corrected Notice of Allowability for U.S. Appl. No. 14/728,904, dated Oct. 13, 2016, 9 pages.
Non-Final Office Action for U.S. Appl. No. 14/728,759, dated Jul. 26, 2016, 16 pages.
Notice of Allowance for U.S. Appl. No. 14/823,739, dated Jul. 12, 2016, 8 pages.
International Preliminary Report on Patentability for PCT/US2015/033830, dated Dec. 15, 2016, 8 pages.
International Preliminary Report on Patentability for PCT/US2015/033811, dated Dec. 15, 2016, 7 pages.
International Preliminary Report on Patentability for PCT/US2015/044694, dated Feb. 23, 2017, 8 pages.
Final Office Action for U.S. Appl. No. 14/728,759, dated Feb. 15, 2017, 18 pages.
Second Written Opinion for PCT/US2016/033793, dated Apr. 4, 2017, 5 pages.
Non-Final Office Action for U.S. Appl. No. 15/295,701, dated Apr. 28, 2017, 6 pages.
Notice of Allowance and Examiner-Initiated Interview Summary for U.S. Appl. No. 15/295,718, dated Aug. 14, 2017, 16 pages.
Non-Final Office Action for U.S. Appl. No. 14/728,759, dated Aug. 3, 2017, 19 pages.
International Preliminary Report on Patentability for PCT/US2016/020670, dated Sep. 14, 2017, 7 pages.
International Preliminary Report on Patentability for PCT/US2016/033793, dated Jun. 27, 2017, 6 pages.
Supplemental Notice of Allowability for U.S. Appl. No. 15/295,718, dated Nov. 15, 2017, 12 pages.
Supplemental Notice of Allowability for U.S. Appl. No. 15/295,718, dated Dec. 8, 2017, 12 pages.
Notice of Allowance for U.S. Appl. No. 15/295,701, dated Sep. 25, 2017, 7 pages.

* cited by examiner

METHOD AND SYSTEM OF PROVIDING A PICTURE PASSWORD FOR RELATIVELY SMALLER DISPLAYS

RELATED APPLICATIONS

This application is a continuation of U.S. patent application Ser. No. 15/069,635, filed Mar. 14, 2016, now U.S. Pat. No. 9,582,106, which is a continuation of U.S. patent application Ser. No. 14/728,902, filed Jun. 2, 2015, now U.S. Pat. No. 9,323,435, which claims the benefit of provisional patent application Ser. No. 62/006,466, filed Jun. 2, 2014, and provisional patent application Ser. No. 62/025,141, filed Jul. 16, 2014 the disclosures of which are hereby incorporated herein by reference in their entireties.

U.S. patent application Ser. No. 14/728,902 is a continuation-in-part of U.S. patent application Ser. No. 14/693,121, filed Apr. 22, 2015, now U.S. Pat. No. 9,300,659, which claims the benefit of provisional patent application Ser. No. 61/982,375, filed Apr. 22, 2014, the disclosures of which are hereby incorporated herein by reference in their entireties.

FIELD OF THE DISCLOSURE

The present disclosure relates generally to proof of knowledge enrollment or authentication and, more particularly, to systems and methods for providing a picture password.

BACKGROUND

Authentication mechanisms use one or more authentication factors to control access to secured information. An authentication mechanism may require a knowledge factor (e.g., a username and a password), an ownership factor (e.g., a hardware security token), an inherence factor (e.g., a biometric identifier such as a fingerprint), or combinations thereof. Thus, for example, authentication of a user on a web portal can involve "what you know," "what you have," and "who you are." The first of these is commonly referred to as proof of knowledge.

Authentication based on proof of knowledge includes an enrollment phase to define user knowledge and a use phase to authenticate a user that proves that knowledge. A non-limiting example of proof of knowledge is a technology known as "picture password" (see, e.g., Wayne Jansen et al., "Picture Password: A Visual Login Technique for Mobile Devices," National Institute of Standards and Technology, NISTIR 7030, July 2003). Similar picture password functionality has been incorporated into WINDOWS® 8 for logging into the WINDOWS® 8 operating system. A picture password includes a combination of one or more input actions associated with a known image (e.g., without limitation, a still picture, a motion picture with or without sound, a photograph, or the like) that may be used to authenticate a user who is able to prove his knowledge by repeating the input actions in conjunction with the image. Another non-limiting example of a proof of knowledge that uses a "picture password" is disclosed by U.S. Pat. No. 8,813,183 entitled METHOD AND SYSTEM FOR PROCESSOR OR WEB LOGON, which is incorporated herein by reference in its entirety. U.S. Pat. No. 8,813,183 discloses the use of an image and knowledge about that image that a user can readily remember for authentication.

Picture passwords can replace or supplement conventional passwords as proofs of knowledge. For example and without limitation, picture passwords can be used for web logins to access web accounts (e.g., without limitation, a bank account, a brokerage account, electronic billing, or a payment system). Thus, a picture password can replace a textual password, Personal Identification Number (PIN), or pass phrase (i.e., conventional passwords). A username is typically associated with any proof of knowledge because it is possible to have a non-unique conventional password. Although a picture password may be more unique than other conventional passwords, a unique username may still be required by a Relying Party (RP) (e.g., the bank providing the bank account, the brokerage firm providing the brokerage account, or the proprietor of the electronic billing or payment system) to ensure security.

Authentication mechanisms may also distinguish between human and machine input. Systems such as Completely Automated Public Turing test to tell Computers and Humans Apart (CAPTCHA) provide a type of challenge-response test used in computing to determine whether or not a user is a human, instead of, for example, a "robot" or other type of computer agent seeking to thwart an authentication mechanism. A CAPTCHA protects websites against robots by generating and grading tests that humans can pass but current computer programs cannot. For example, human input is authenticated by displaying distorted text that only a human user can perceive and input.

It is believed that text-based passwords or picture passwords do not provide protections similar to those provided by CAPTCHA. However, picture password technology has a number of advantages over text-based passwords, including more entropy for fewer actions. Entropy refers to a lack of predictability of input actions and provides a measure of the strength of proof of knowledge.

Picture passwords have greater entropy because their corresponding vocabulary is larger than textual passwords that rely on a combination of characters. Vocabulary refers to the range of inputs used for authentication. Much of the difference in vocabulary size over text-based passwords results from a wide range of possible unique input actions over a range of locations on a unique image.

To prove user knowledge without actually recording a password, it is desirable to store a picture password as a cryptographic hash of input actions associated with an image. This almost always involves discretizing a displayed image into a grid that has multiple sections by using, for example, various tessellation techniques (e.g., without limitation, rectangular grids, hexagonal grids, or Voronoi tessellations). Further, vocabulary size for picture passwords decreases as error tolerance increases due to placement of the grid and tolerance of inputs at adjacent grid locations (e.g., without limitation, a tolerance of 9 for rectangular grids or 7 for hexagonal grids).

The use of touch-sensitive surfaces as input devices for electronic devices has increased significantly in recent years. As such, touch-sensitive surfaces are widely used as input devices to authenticate users. Examples of touch-sensitive surfaces include touch pads and touch screen displays.

For portable and/or handheld electronic devices with relatively small display screens, existing picture password methods are cumbersome, inefficient, and inaccurate. For example, a portable handheld device with a small screen (e.g., smartphones and other pocket-sized devices) displays a relatively small image for a picture password but still requires a high degree of accuracy to authenticate a user.

Current picture password systems may be fashioned by selecting a number of element(s) associated with an image in response to a gesture such as a stroke(s) that form drag paths on an image, including stroke(s) that form drag paths that avoid previous stroke(s) on the image. This situation creates a significant cognitive burden on a user that may have difficulty seeing and inputting actions on small display devices with sufficient accuracy to authenticate the user.

Thus, there is a problem when going from a relatively larger picture display to a relatively smaller picture display such as, for example and without limitation, going from a laptop display screen to a relatively smaller smartphone touch-sensitive display, while trying to preserve the entropy advantage of picture passwords. An input object such as a user's finger or stylus can be cumbersome to touch, swipe, or move along a path with sufficient precision to correctly select grid locations required for a picture password. In addition, users would prefer to use the same picture password created, for example, with a mouse on a high resolution display on a relatively smaller touch-sensitive display of a smartphone.

With the wide range of available display sizes (e.g., without limitation, desktop, laptop, tablet, smartphone, or wearable display screens) and the various types of pointer (e.g., cursor) interactions (e.g., without limitation, caused by a mouse, a gesture on a touch-sensitive display, or a "hoverscreen" with which a user can hover a hand or finger a distance away from the display surface and cause an action, such as flipping through an e-book or surfing the web, without causing a finger smudge), there is a need for a user input mechanism that allows the same picture password activity to be detected across all possible display sizes and cursor interaction types in a way that is seamless to a user. Accordingly, a need exists for devices, systems, and methods that employ picture passwords on relatively small display screens.

SUMMARY

Embodiments described herein relate to a device operable to process input for a picture password for proof of knowledge. In some embodiments, the device includes a display, an input subsystem, processor(s), and memory containing instructions executable by the processor(s) such that the device is operable to display, on the display of the device, an image for the picture password proof of knowledge. The image is associated with an overlaid grid comprising a plurality of elements, and each element corresponds to a distinct area of the image. The device is further operable to, determine an offset to be used and, in response to receiving an input via the input subsystem at a first location of the display, highlight an element of the overlaid grid at a second location on the image for the picture password proof of knowledge on the display. The second location is offset from the first location by the offset. As a result of the disclosed embodiments, the increased entropy provided by picture passwords is maintained or improved because error tolerance is maintained or decreased due to improved precision when entering input actions for a picture password.

In some embodiments, the first location is within the image for the picture password proof of knowledge.

In some embodiments, the device is further operable to display a white space area along an outer edge of the displayed image, wherein the first location is within the white space area.

In some embodiments, the input subsystem comprises a touch-sensitive display.

In some embodiments, the offset is determined based on a saved offset value. In some embodiments, the offset is determined based on a detected touch diameter.

In some embodiments, the offset is determined by the device being operable to, in response to receiving a training input via the input subsystem at a first training location on the first image on the display, continually change a highlighted element of the overlaid grid until the training input is concluded where the highlighted element is at a second training location on the first image on the display. The offset is set to be the difference between the first training location and the second training location.

In some embodiments, the device is further operable to display, on the display of the device, the overlaid grid having the plurality of elements. In some embodiments, the device is further operable to not display, on the display of the device, the overlaid grid having the plurality of elements.

In some embodiments, the device further comprises a clock subsystem, and the input activates a predetermined timer controlled by the clock subsystem. In some embodiments, the device further comprises a clock subsystem, and the input deactivates a predetermined timer controlled by the clock subsystem.

In some embodiments, the input is selected from a group consisting of a touch input, a mouse input, and a hover input. In some embodiments, the input is selected from a group consisting of a down input, a move input, and an up input.

In some embodiments, the device further comprises a clock subsystem, and the device is further operable to determine a state of a predetermined timer controlled by the clock subsystem.

In some embodiments, if the input is a down input (e.g., a touch down or a click down input), the device is further operable to designate the element of the overlaid grid at the second location as a prospective start-point for an input action if a predetermined timer is inactive, and designate the element of the overlaid grid at the second location as a prospective end-point for an input action if the predetermined timer is active. In some embodiments, if the element of the overlaid grid at the second location is designated as a prospective end-point for the input action, the device is further operable to display a line between a previously set start-point for the input action and the prospective end-point for the input action.

In some embodiments, the device is further operable to determine a designation of the element of the overlaid grid at the second location on the image for the picture password proof of knowledge, wherein the designation is selected from a group consisting of a prospective start-point for an input action and a prospective end-point for an input action.

In some embodiments, if the input is a move input (e.g., moving a finger or a mouse cursor after a touch/click down input), if the element of the overlaid grid at the second location corresponds to a prospective start-point, the device is further operable to move the prospective start-point in accordance with the move input. If the element of the overlaid grid at the second location corresponds to a prospective end-point, the device is further operable to move the prospective end-point in accordance with the move input.

In some embodiments, if the element of the overlaid grid at the second location corresponds to a prospective end-point for the input action, the device is further operable to move a line displayed between a start-point for the input action and the prospective end-point in accordance with the move input.

In some embodiments, if the input is an up input (e.g., a touch up or click up input), the device is further operable to, if the element of the overlaid grid at the second location corresponds to the prospective start-point for the input action, set the element of the overlaid grid at the second location as a start-point for the input action and activating the predetermined timer. If the element of the overlaid grid at the second location corresponds to the prospective end-point for the input action, the device is further operable to set the element of the overlaid grid at the second location as an end-point for the input action. In some embodiments, the device is further operative to display a line between a start-point and an end-point of the input action.

In some embodiments, the device is a handheld mobile device and the display is integrated in the mobile device.

In some embodiments, the overlaid grid comprising a plurality of elements supports a plurality of different sizes for the overlaid grid. In some embodiments, the device is further operable to receive an input from the input subsystem that designates a size of the overlaid grid comprising a plurality of elements from the plurality of different sizes. In some embodiments, the device further comprises a communications interface, and the device is operable to receive an input via the communications interface that designates a size of the overlaid grid comprising a plurality of elements from the plurality of different sizes.

In some embodiments, the image for the picture password proof of knowledge comprises a plurality of input layers, and the device is further operative to, if the input is a first type of input, detect the input on a first layer of the plurality of input layers and, if the input is a second type of input, detect the input on a second layer of the plurality of input layers. In some embodiments, the input subsystem is a first input subsystem, the first type of input is a touch input determined via the first input subsystem, and the second type of input is a hover input determined via a second input subsystem.

In some embodiments, the device is further operable to, prior to displaying the image for the picture password proof of knowledge, display, on the display of the device, one or more second images associated with a predefined textual hint and a predefined input action, detect an input action with respect to the one or more second images, and verify whether the input action detected with respect to the one or more second images is the predefined input action associated with the one or more second input actions. The device is further operative to provide access to the image for the picture password proof of knowledge and highlight the element of the overlaid grid at the second location of the display that is offset from the first location by the offset upon verifying that the input action detected with respect to the one or more second images is the predefined input action associated with the one or more second input actions.

In some embodiments, the device is further operative to, prior to displaying the image for the picture password proof of knowledge, display, on the display of the device, one or more images comprising a plurality of objects, wherein each of the plurality of objects is associated with class designation information indicative of one or more of at least two separate and perceptibly distinct classes. The device is further operative to highlight a first object from the plurality of objects, the highlighted first object belonging to a first class of objects from the at least two separate and perceptibly distinct classes, and receive an input to select a second object from the plurality of objects. The device is further operative to provide access to the image for the picture password proof of knowledge and highlight the element of the overlaid grid at the second location of the display that is offset from the first location by the offset upon verifying that the second object belongs to the first class of objects.

In some embodiments, the device is further operable to, prior to displaying the image for the picture password proof of knowledge, display, on the display of the device, one or more second images comprising a plurality of objects, display, on the display of the device, a predefined textual analogy associated with a first class of the separate and perceptibly distinct classes of objects, highlight a first object from the plurality of objects, and receive an input to select a second object from the plurality of objects. The device is further operative to provide access to the image for the picture password proof of knowledge and highlight the element of the overlaid grid at the second location of the display that is offset from the first location by the offset upon verifying that the second object together with the first object satisfies the predefined textual analogy.

In some embodiments, the device comprises a communications interface, and prior to the display of the image for the picture password proof of knowledge, the device is further operative to display, on the display of the device, one or more prospective images provided from a web server over a network via the communications interface of the device, receive an input indicative of a selection of one of the one or more prospective images, and designate the one of the one or more prospective images as the image for the picture password proof of knowledge.

Embodiments of methods of operation of a device to process an input for a picture password for proof of knowledge are also disclosed.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
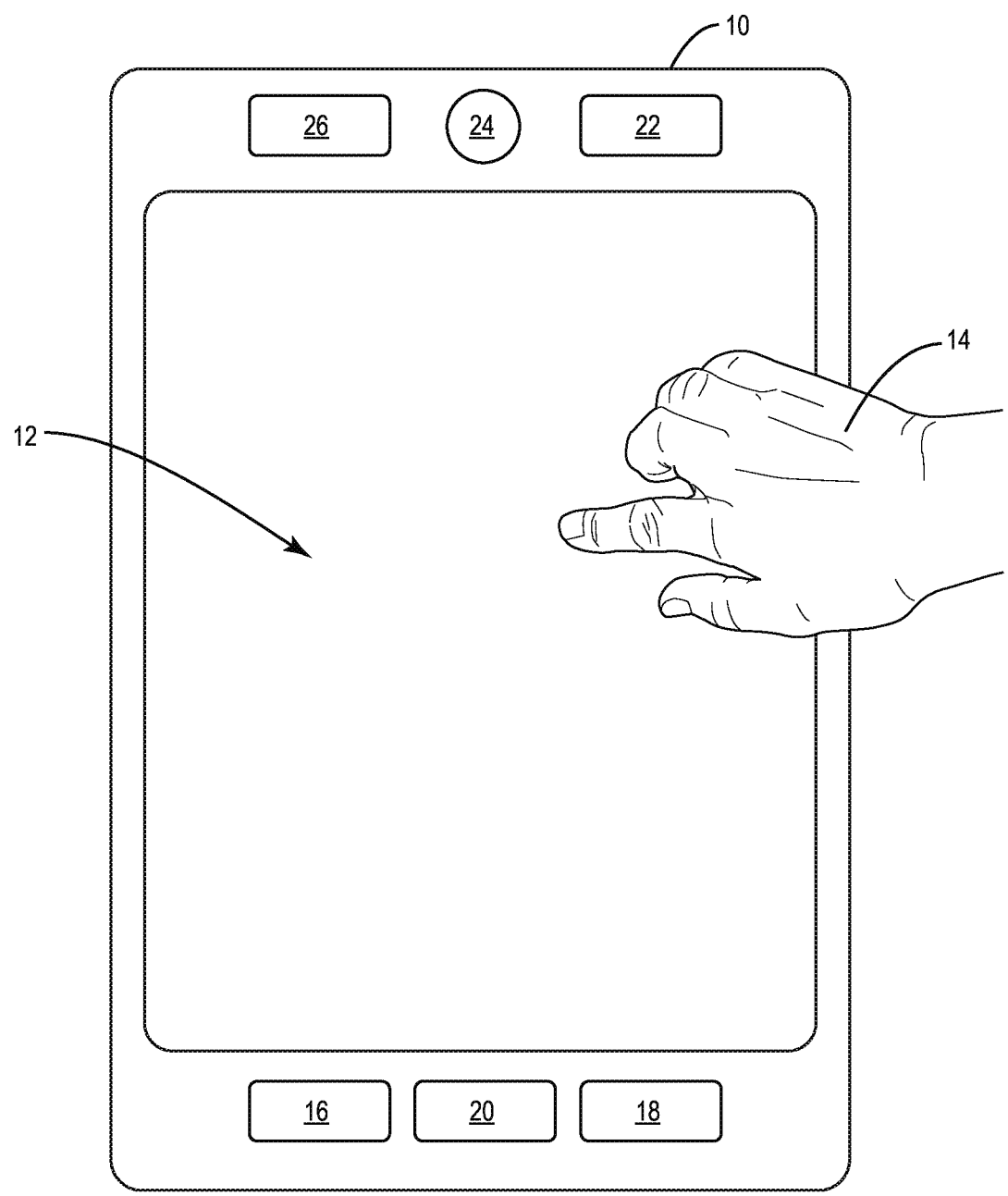
FIG. 1 illustrates a portable electronic device having a touch-sensitive display according to some embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The purpose of terminology used herein is only for describing embodiments and is not intended to limit the disclosure.

As used herein, terms such as "first," "second," "third," and the like distinguish one element from another but should not limit the elements. For example, an element can be termed a first element or a second element without departing from the scope of the present disclosure.

As used herein, the term "number" shall mean one or an integer greater than one (e.g., a plurality).

As used herein, the term "and/or" includes any and all combinations of one or more items modified by the term.

As used herein, the term "processing device" may refer to a programmable analog and/or digital device that can store, retrieve, and process data. A processing device is also referred to herein as an electronic device. Examples of a processing device include a computer, a workstation, a personal computer, a smartphone, a mobile phone, a wearable device such as a smart watch, a tablet computer, a kiosk, a server offering web access, a mainframe computer, a mini-computer, any generic or specific server, a microcomputer, or any suitable processing device or apparatus.

In some embodiments, a "processor" may refer to a part or component of a processing device that controls and executes computer instructions stored in, for example, memory such as non-transitory computer readable medium(s). Examples of a processor include a microprocessor, a microcontroller, a networked processor, a controller, a Central Processing Unit (CPU), or the like.

As used herein, "memory" may refer to volatile memory such as random access memory and/or non-volatile memory such as magnetic disk storage device(s), flash memory devices, or other solid-state memory devices.

As used herein, the term "routine" shall refer to a program running on a processor that comprises instructions to be executed by a processor.

As used herein, the term "display" shall include an output device of a processing device structured to display an image. A display may optionally provide an input to a processor such as, for example and without limitation, a touch-sensitive display.

As used herein, the term "image" shall include at least one of a still picture, a motion picture with or without sound, and a photograph, such as a digital photograph.

As used herein, the term "still picture" shall include a two-dimensional array of digital pixel values.

As used herein, the term "picture password" shall refer to using one or more known input actions associated with a known image to provide a password for access to secured information, and/or include any suitable system or method for a proof of knowledge about an image that a user can readily remember.

As used herein the term "input" refers to data provided by an input device (e.g., a mouse, a touchpad, or a touch-sensitive display) to an electronic device. Inputs may generally include mouse inputs (e.g., click down, click up, and move) and touch inputs (touch down, touch up, and move).

As used herein, the terms "click" or "touch" shall refer to type of input or, depending on the context, a click/touch down input that can define a "point" on a displayed image (e.g., a "grid point" on a grid that overlays a displayed image).

As used herein, the term "input action" refers to a pattern of one or more inputs detected by an electronic device. An input action may be used to enter a picture password. For example, an input action may include a gesture defined by a pattern of touch inputs. Other examples of input actions include a point action that causes an electronic device to designate a point on a display, and a line action that causes the electronic device to draw a line between a start-point on a display and an end-point on a display. Some specific input actions include a stroke (or stroke action), a drag path (or drag path action), and a click/touch (a click/touch action).

As used herein, the term "stroke" shall refer to an input action that includes two points on an image (i.e., two distinct points on an image).

As used herein, the term "drag path" shall refer to an input action that includes a path taken between a beginning point of a stroke and an end-point of a stroke.

FIG. 1 illustrates a portable electronic device 10 having a touch-sensitive display 12 according to some embodiments of the present disclosure. The touch-sensitive display 12 may display one or more graphics (e.g., images, objects, and the like) within a Graphical User Interface (GUI), which is also referred to herein simply as a User Interface (UI). In this example, a user interacts with the electronic device 10 via the touch-sensitive display 12 using an input object 14 (e.g., by touching the touch-sensitive display 12 with the input object 14). Examples of the input object 14 include, but are not limited to, one or more of the user's fingers (not drawn to scale in the figure) or a stylus. Via the touch-sensitive display 12, the electronic device 10 may receive various types of inputs (e.g., touches or mouse clicks) that are processed to detect an input action, e.g., gestures (e.g., taps, strokes, or swipes) or the like.

The electronic device 10 may include physical buttons such as an "exit" button 16 or a "home" button 18 that are used to navigate application(s) executed on the electronic device 10. The buttons 16, 18 may be implemented as virtual controls of the GUI displayed on the touch-sensitive display 12. The electronic device 10 may include various other physical and virtual features (not shown) such as a button for powering the electronic device 10 on/off and locking the electronic device 10, volume adjustment button(s), a head set jack, a docking/charging external port, and the like.

In conjunction with a microphone 20, a speaker 22, an optical sensor 24, an accelerometer 26, and components that are not shown for the sake of brevity, the electronic device 10 may be, for example, a handheld smartphone used to establish telephone calls, access the Internet, capture images, and the like. The electronic device 10 may use any of a plurality of communications standards, protocols, and technologies detailed further below. The electronic device 10 is one non-limiting example of a small screen device. Other examples of electronic devices that have even smaller display screens include media players, tablets, and wearables such as smart watches.

Figure 2:
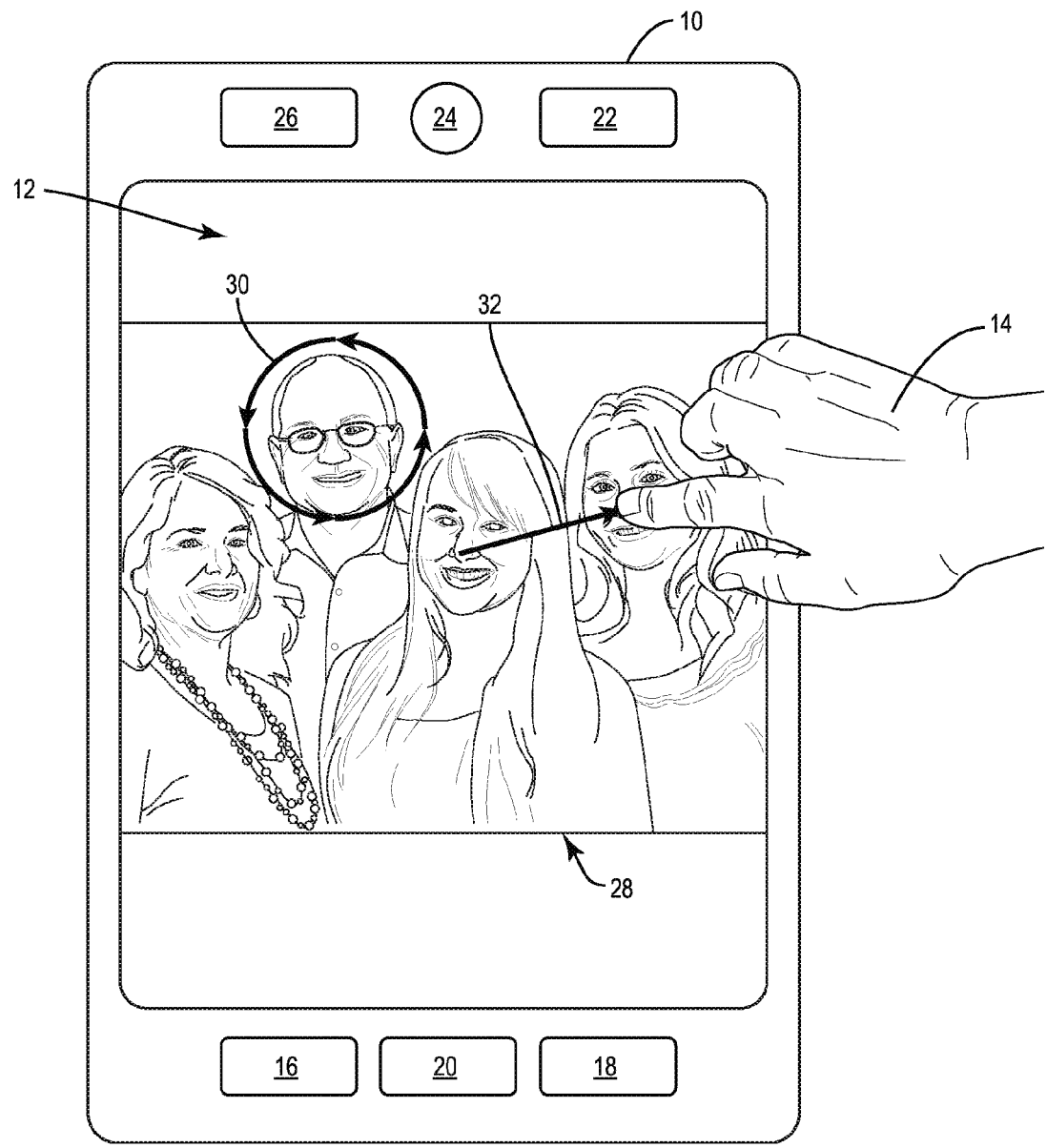
FIG. 2 illustrates a user interface for a picture password proof of knowledge displayed on the portable electronic device of FIG. 1.

Before describing embodiments of the present disclosure, a description of problems associated with the implementation of conventional picture password mechanisms on small display devices, particularly small devices with touch-sensitive displays (e.g., smartphones), is beneficial. FIG. 2 illustrates a user interface for a conventional picture password proof of knowledge displayed on the electronic device 10 of FIG. 1. As shown, a picture password is entered on an image 28 displayed on the touch-sensitive display 12. The input object 14 is one or more fingers that provide input actions via touch gestures on the touch-sensitive display 12. The user inputs a picture password by providing appropriate input actions on the touch-sensitive display 12 relative to the image 28. In this example, via the appropriate input action, the user draws a counter clockwise circle 30 around the face of the second person from the left in the image 28, and a line 32 from the nose of the third person from the left in the image 28 to the fourth person from the left in the image 28. Assuming that these input actions correspond to the correct picture password, the user is authenticated.

The benefits of using picture passwords with conventional picture password input techniques diminish as electronic devices continue to reduce in size and continue to rely on touch-sensitive displays as primary input mechanisms. Unfortunately, entering a picture password on these types of devices using conventional picture password input techniques is prone to errors because the size of an image is reduced in proportion to the size of the display, and the input object 14 (e.g., the user's finger, stylus, etc.) obstructs the displayed image for a picture password such that it is difficult for the user to accurately and precisely provide the appropriate input actions.

Thus, many issues arise when attempting to utilize conventional picture password input mechanisms on touch-screen devices, such as the electronic device 10, particularly as the size of the touch-sensitive display 12 decreases. For example, implementing picture passwords on smaller touch-sensitive displays using conventional picture password input mechanisms requires greater error tolerance for imprecise input actions. As indicated above, picture passwords generally have greater entropy over conventional passwords because picture passwords have a greater range of input actions (i.e., a larger vocabulary). As the error tolerance increases to accommodate imprecise input actions on a small screen, the range of input actions that are possible decreases (i.e., a smaller vocabulary). Accordingly, the benefit of the increased entropy offered by picture passwords is significantly diminished when implementing conventional picture password mechanisms on small display devices.

Other drawbacks include a lack of seamless usability of a picture password authentication mechanism between displays of different sizes. For example, a picture password on a device having a larger display may have greater usability than the same picture password on a device having a smaller display because inputs for the picture password can be more precisely controlled on the device having the larger display. Entering the same picture password on a small touch-sensitive display is problematic because it is difficult to see and navigate the image and the input object obstructs the image. Ultimately, existing input mechanisms for picture passwords on small displays are cumbersome, inefficient, and inaccurate.

Many potential solutions to the aforementioned drawbacks of picture passwords on small displays are substantially inadequate. For example, one solution is using different picture passwords for different display sizes. However, this solution increases the cognitive burden on a user to remember the different passwords to access the same secured information. On the other hand, using the same password for displays of different sizes, where the range of inputs on the smaller display is limited, increases the risk that the password could be discovered easily by an unauthorized user.

Other solutions to the aforementioned drawbacks could be to enable pan-and-zoom of a picture display on the relatively smaller display device. However, as a practical matter, it is difficult to both pan-and-zoom and perform a drag path action because this requires a state change while maintaining several interacting states. For example, a drag path by moving a user's finger could cause a panning action if the path reaches an edge of the picture display, and this is difficult to control consistently across all types of web browsers and for all types of smartphones. Hence, it would not be desirable to require any pan-and-zoom functionality.

Another solution includes using a content magnifier to magnify a portion of an image relative to the entire image. The magnified portion corresponds to a location on the image that a user desires to manipulate. However, entering a picture password by using the content magnifier is a hassle because a portion of the displayed image is distorted such that navigating the image to enter input actions such as lines is cumbersome. This solution is also very processor intensive. It involves having two copies of a GUI that includes the image loaded into memory, one small and one full-size, and constantly updating the GUI based on touch positions and hiding/showing portions of the larger GUI. It also involves updating and changing both GUIs to ensure that they remain synchronized. Moreover, this solution is undesirable because it requires excess consumption of power and processing resources, which are increasingly limited on smaller electronic devices.

Another solution includes displaying a picture password image at its full resolution on a small display, rather than scaling the image to fit the smaller display. In other words, a magnified image is displayed on a smaller display and portions of the image are off the screen. Several different navigation techniques could be implemented for scrolling the display screen to a desired location on this image. For example, the image could be moved left, right, up, or down when a finger approached an edge of the UI. Another navigation technique is constantly moving the image to track the direction of a moving finger. This solution is undesirable because the inability to see the entire image as a whole makes it difficult to register new passwords. Moreover, navigation techniques such as scrolling operate inconsistently on smaller devices that have limited processing resources. Further, moving the image to track the location of a finger causes inadvertent input actions. For example, scrolling from one edge of the image to another edge of the image may cause inadvertent input actions.

Accordingly, a need exists for systems and methods that enable the use of picture passwords on small display devices that effectively maintain increased entropy, provide seamless usability with displays of different sizes, and facilitate accurate operations for input actions, while conserving the limited resources of small display devices.

The present disclosure solves the aforementioned drawbacks by providing devices, systems, and methods for using picture passwords as proof of knowledge on small display devices. Embodiments include methods of operation of an electronic device, such as the electronic device 10, to process input for a picture password for proof of knowledge. For example, the electronic device 10 displays an image for the picture password proof of knowledge on the touch-sensitive display 12. The image is associated with an overlaid grid having a plurality of elements where each element corresponds to a different (e.g., distinct) area of the image. In response to receiving an input at a first location of the touch-sensitive display 12, the electronic device 10 highlights an element of the overlaid grid (thereby highlighting the corresponding area of the image for the picture password) at a second location of the touch-sensitive display 12 that is offset from the first location by a predetermined offset. The predetermined offset may be fixed (e.g., fixed across all devices and all display sizes) or may be a function of one or more predefined criteria (e.g., display size), as discussed below.

As such, the present disclosure provides for using picture passwords in a manner that is desirable because a picture password can be entered accurately on display devices of different sizes by using the same or different input devices. As a result, the increased entropy provided by picture passwords is at least maintained for small display devices because the range of available inputs is at least maintained due to improved precision when entering input actions for a picture password.

The disclosed mechanisms detailed below facilitate implementation of picture passwords on images rendered on relatively small display devices, while preserving the entropy advantage of picture passwords. As such, picture passwords may be more readily adopted to replace or supplement textual passwords or other proofs of knowledge by using a combination of different input actions that includes selected grid element(s) located at different positions on an image and/or a combination of different path selections (e.g., without limitation, image-based clicks and strokes by a mouse or touch input device). The disclosed mechanisms greatly reduce the effort and hassle of using picture passwords to login to secured systems via small display devices. Accordingly, the advantages of using memorable and unique picture passwords and the benefits of higher security assurances become readily available to users of small screen devices.

The disclosed mechanisms include different navigation modes for fine control of input actions on images rendered on small display devices. For example, as detailed below, FIGS. 3 through 6 illustrate embodiments that include different navigation modes that can be tailored for different environments, such as web environments, and for different types of displays of different sizes.

In some embodiments, navigation modes can avoid obscuring the location of a pointer (e.g., cursor) due to the size of the input object 14 (e.g., the user's finger) by offsetting the location of the pointer from the location of the input object 14. For example, in a first mode, the pointer can be located offset from and to the left of a location of an input object 14. In a second mode, for example, the pointer can be located offset from and to the right of a location of the input object 14. In a third mode, for example, the pointer can be located offset from and above or below the location of the input object 14. In some embodiments, the selected location of a grid element is offset from the location of the pointer and/or finger in any direction including left, right, up, down, or any combination of directions (e.g., without limitation, right and up).

In some embodiments, as detailed below with respect to FIGS. 3 through 6, two different methods are used for implementing picture passwords on relatively small display devices. For example, one method involves increasing the size of grid elements. It is often possible to maintain the vocabulary advantage with a reduced number of grid elements because vocabulary size is not just a function of a number of grid elements that are selected on the picture display, but is also a function of the different types of possible input actions on grid elements.

Different types of input actions can be associated with an image to increase the vocabulary of a picture password. For example, U.S. Pat. No. 8,813,183 entitled METHOD AND SYSTEM FOR PROCESSOR OR WEB LOGON, which is incorporated herein by reference in its entirety, teaches three types of input actions, namely, selecting a grid element, a stroke formed by a drag path, and a stroke formed by a drag path that avoids a previous stroke. As another example, WINDOWS® 8 teaches three types of actions, namely, selecting an element, a stroke formed by a drag path, and a circle formed by a drag path that returns to the same element. By combining these two different picture password systems, there can be, for example, four types of actions defined in order to increase vocabulary size. It should be appreciated that other types of input action can be defined to further increase vocabulary (see, e.g., the "special stroke" discussed below).

Another method that can be used to implement picture passwords on relatively small display devices when using conventional picture password input mechanisms is to simply use a different picture password for the relatively small display devices using a smaller, less detailed, grid. However, this reduces the vocabulary size and thus the entropy of the picture passwords on the relatively small display devices. Systems and methods are disclosed herein that enable the use of large, or detailed, grids for picture passwords even on relatively small display devices. As a result, superior picture passwords can be employed on a small format display (e.g., a smartphone), just like they can be employed on a large format display (e.g., a desktop display, a laptop display, or a tablet display).

FIGS. 3 through 6 show embodiments of a picture password UI 34 that advantageously employ different methods to solve the problem of implementing picture passwords using relatively small display devices. The picture password UI 34 can be displayed on, for example, the touch-sensitive display 12 of the electronic device 10, and includes an image 36 comprising an entire picture for the picture password. A grid that includes grid elements 38 overlays the image 36 such that each grid element 38 corresponds to a separate and distinct area or point on the image 36. In this example, the grid elements 38 are circles, but are not limited thereto. In some embodiments, the grid elements 38 are highlighted when selected. The grid elements 38 provide a "snapped to" or "snap to" feature, wherein a click or touch input at a location on the image 36 (via, e.g., the touch-sensitive display 12 or some other input device such as a mouse) results in the selection of a corresponding grid element 38 that includes or is closest to the location indicated by the click or touch input.

Figure 11:
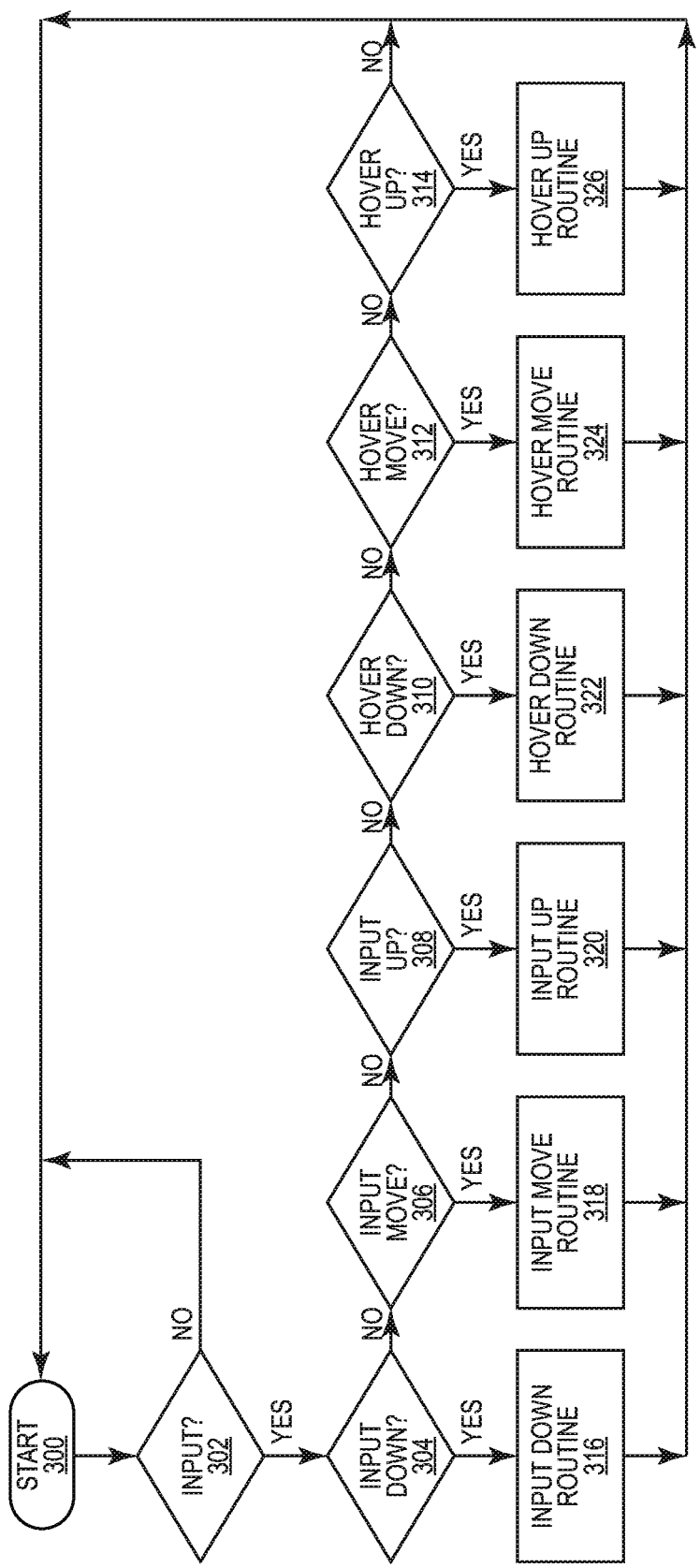
FIG. 11 is a flowchart illustrating the operation of an electronic device to accept inputs for a picture password proof of knowledge including hover inputs according to some embodiments of the present disclosure.
Figure 12:
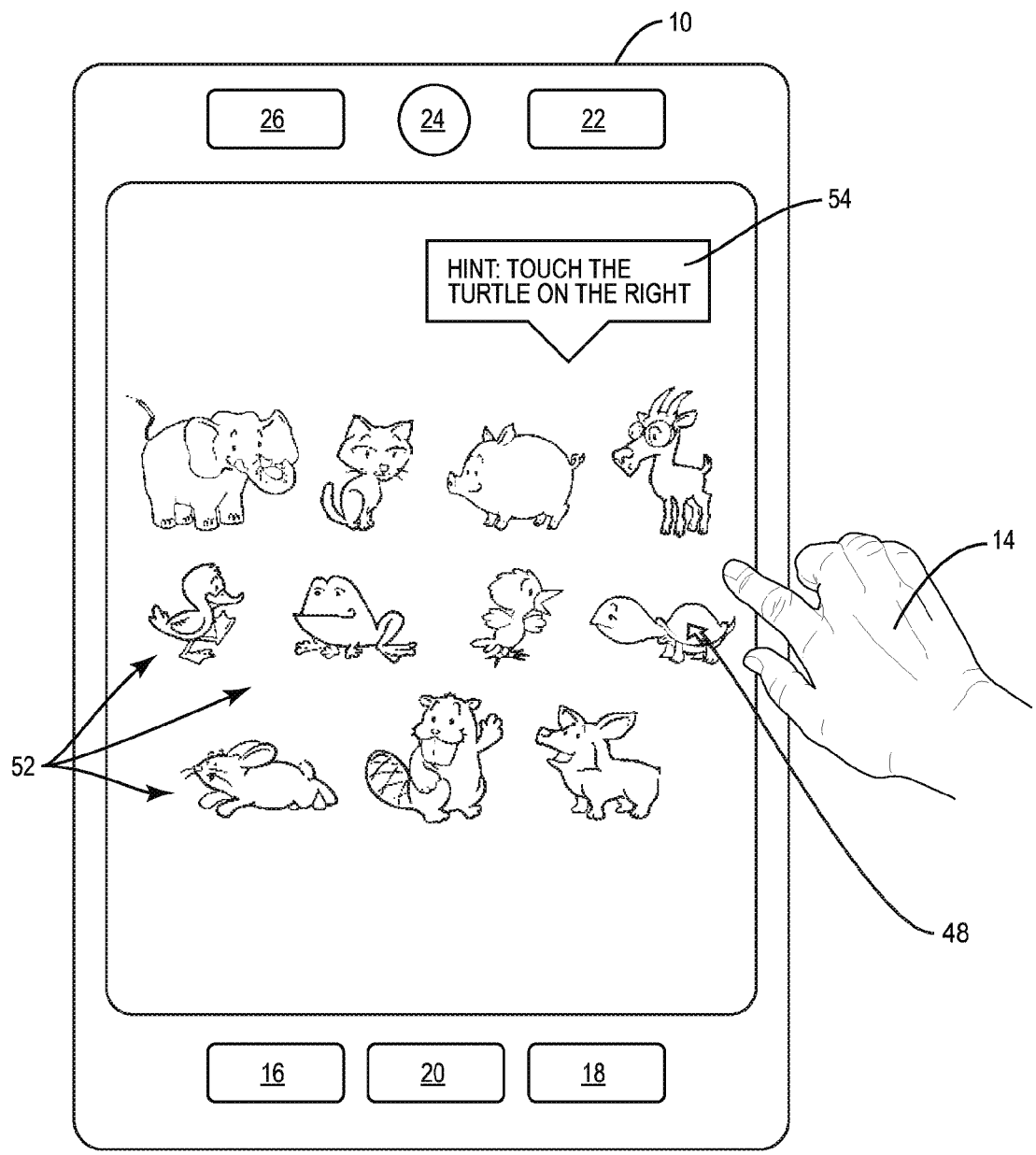
FIG. 12 illustrates a user interface for providing robot threat control by displaying a prompt(s) associated with an input action(s) on an image according to some embodiments of the present disclosure.

In some embodiments, the grid elements 38 may be displayed over the image 36 such that the grid elements 38 are visible to the user. However, actually displaying the grid elements 38 is unnecessary for entering the picture password. For example, the grid disclosed in U.S. Pat. No. 8,813,183 shows embodiments that display a grid or do not display a grid (e.g., FIG. 11 shows an implicit grid 1102 and FIG. 12 shows no visible grid). Also, WINDOWS® 8 uses an underlying invisible grid such that it does not use visible grid snapping. See Zach Pace, "Signing in with a picture password," blogs.msdn.com/b/b8/archive/2011/12/16/signing-in-with-a-picture-password.aspx; and Ziming Zhao et al., "On the Security of Picture Gesture Authentication," Proceedings of the 22nd USENIX Security Symposium, Aug. 14-16, 2013, pp. 383-398.

A touch input (or a mouse or click input) highlights a grid element that may be offset from the actual location of the touch input such that the input object (e.g., the user's finger or stylus) does not obscure the grid element 38 being selected. In some embodiments, a touch input has three states, namely, a down input (e.g., touch down or click down input), a move input, and an up input (e.g., a touch up or click up input). These three input types correspond to three states, and these three states may be operated in succession. For example, in a first state (e.g., a state corresponding to a touch/click down input), a position of a highlighted grid element 38 can be changed without causing a drag path. In a second state (e.g., a state corresponding to a touch/click up input), a grid element 38 is selected or set as a start-point for an input action and a timer is activated, e.g., in response to a touch/click up input. This timed state can remain active for a relatively short predetermined duration (e.g., without limitation, 2.5 seconds or any suitable amount of time). While the timer is active, a stroke input action can be established by a second down input and subsequent move input and up input to set the end-point of the stroke input action. The input action may alternatively be a drag path (i.e., a straight line drag path from the start-point for the input action to the end-point for the input action). This allows for creating a drag path that may perform any of the input actions disclosed in U.S. Pat. No. 8,813,183 and WINDOWS® 8, for example. Notably, as discussed below, if the timer expires before an end-point is set, then the input action is recorded as a touch/click (i.e., a single point input action).

As shown in FIGS. 3 through 6, the picture password UI 34 may include white space 40, which corresponds to an area that is displayed near or adjacent to at least one edge of the image 36 to enable selection of grid elements 38 on the periphery of the image 36. As used herein, the white space 40 corresponds to a portion of the picture password UI 34 that does not include the image 36, but may, in some implementations, include other graphical information. The white space 40 compensates for the offset between the location of an input and a grid element 38 being selected, such as, but not limited to, grid elements 38 on the edge of the image 36. For example, if the offset is to the left of a location of an input, the only way to select the rightmost grid element 38 of the image 36 would be to have the input outside the image 36, to the right within the white space 40. Accordingly, inputs for selecting the grid elements 38 on the periphery of the image 36 can be detected within the white space 40.

In some embodiments, the white space 40 is an area of the picture password UI 34 that does not include any graphical objects. In some embodiments, the white space 40 may include objects such as controls to make the grid elements 38 visible or not visible. The white space 40 may contain any information related or unrelated to the image 36 such as, for example, advertisements.

As indicated above, FIGS. 3 through 6 show configurations for different navigation modes that include different input mechanisms and grid elements of difference sizes. In particular, FIGS. 3 through 6 show that the size of the grid elements 38 can vary in two different navigation modes. For example, circular grid elements 38 are either a first size (FIGS. 3 and 4A through 4C) or a second (larger) size (FIGS. 5 and 6) in a default standard navigation mode (FIGS. 3 and 5) and a touch-sensitive display navigation mode (FIGS. 4A through 4C and 6).

Figure 3:
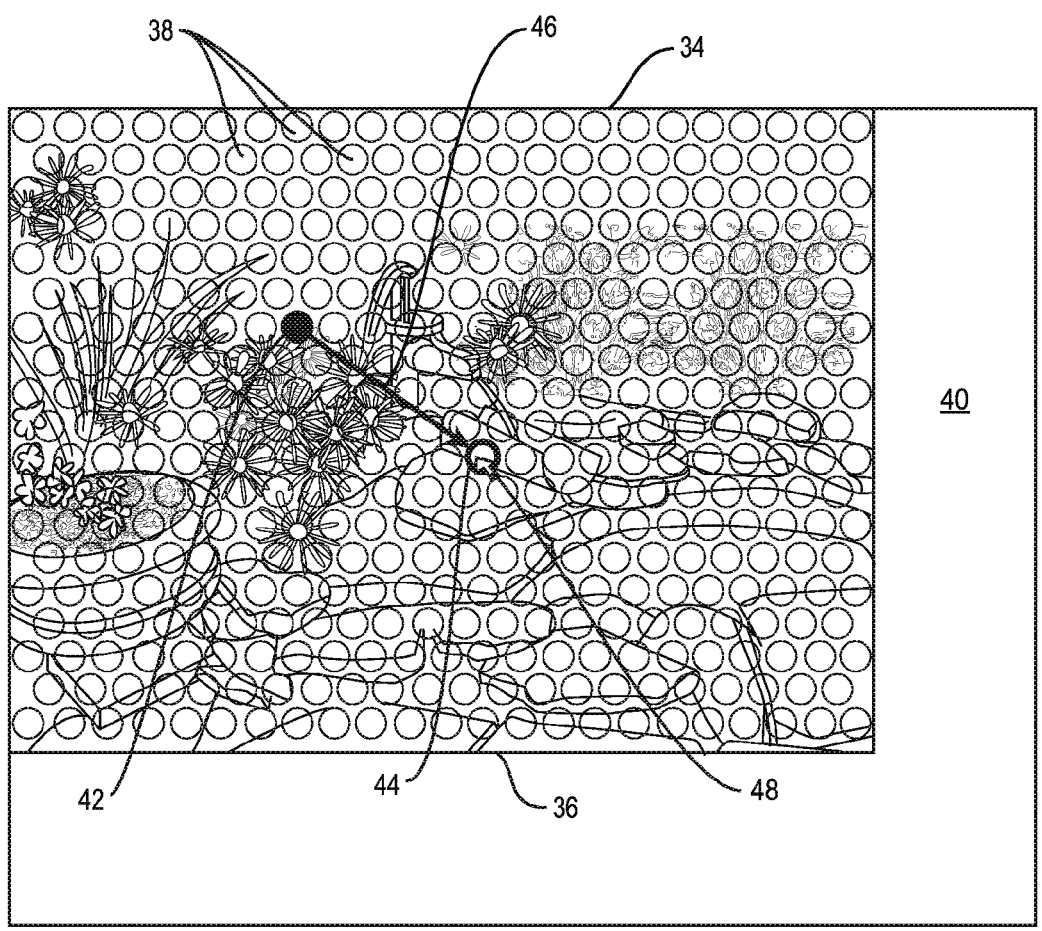
FIG. 3 illustrates a user interface for a picture password proof of knowledge that displays an overlaid grid of relatively small circular grid elements for a default standard navigation mode according to some embodiments of the present disclosure.

FIG. 3 illustrates a standard navigation mode for a picture password proof of knowledge that uses relatively small circles as the grid elements 38 according to some embodiments of the present disclosure. The circles of FIG. 3 are relatively small compared to, for example, the relatively larger circles shown in FIGS. 5 and 6. The standard navigation mode includes the picture password UI 34 that displays the image 36 for the picture password. A grid includes the grid elements 38 that overlay the image 36. The grid elements 38 are shown as relatively small circles for the standard navigation mode. In some embodiments, these relatively small grid elements 38 correspond to a default circle size for a default standard navigation mode.

As shown, an input action for a picture password may include a line action with a start-point 42 and an end-point 44. A line 46 is drawn based on the detected line action from the start-point 42 to the end-point 44. In the standard navigation mode, an offset between a location of an input and a pointer 48 used to snap-to a grid element 38 is zero. In other words, the location of the pointer 48 and the location of a highlighted (e.g., selected) grid element 38 are the same. Thus, the location of the pointer 48 is defined by, for example and without limitation, the location of a mouse input or a touch input (e.g., the location of a user's finger). Accordingly, FIG. 3 shows that a pattern of inputs are detected as a drag path from the beginning point (the start-point 42) of a stroke and a presently selected end-point 44 of the stroke. The drag path causes the electronic device 10 to draw the line 46.

Figure 4A:
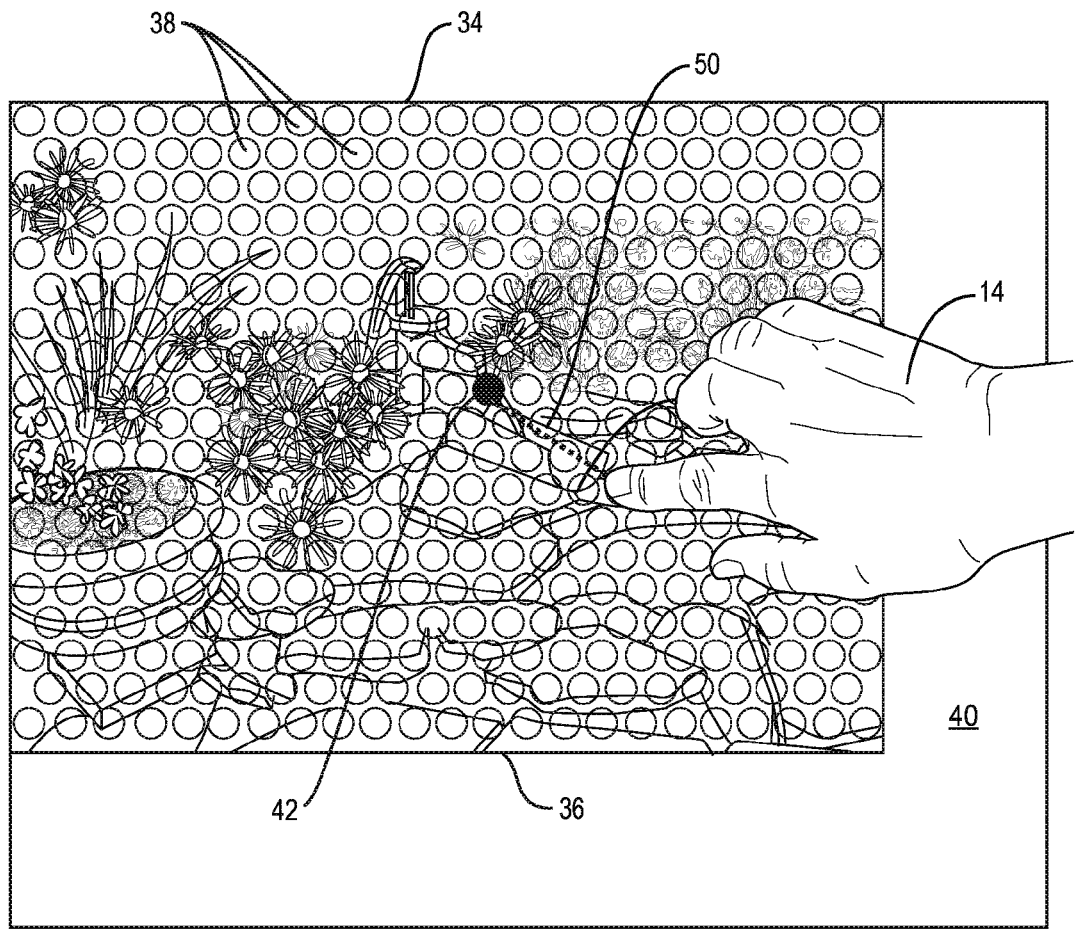
FIG. 4A illustrates a user interface for a picture password proof of knowledge that displays an overlaid grid of relatively small circular grid elements for a touch-sensitive display navigation mode according to some embodiments of the present disclosure.
Figure 4B:
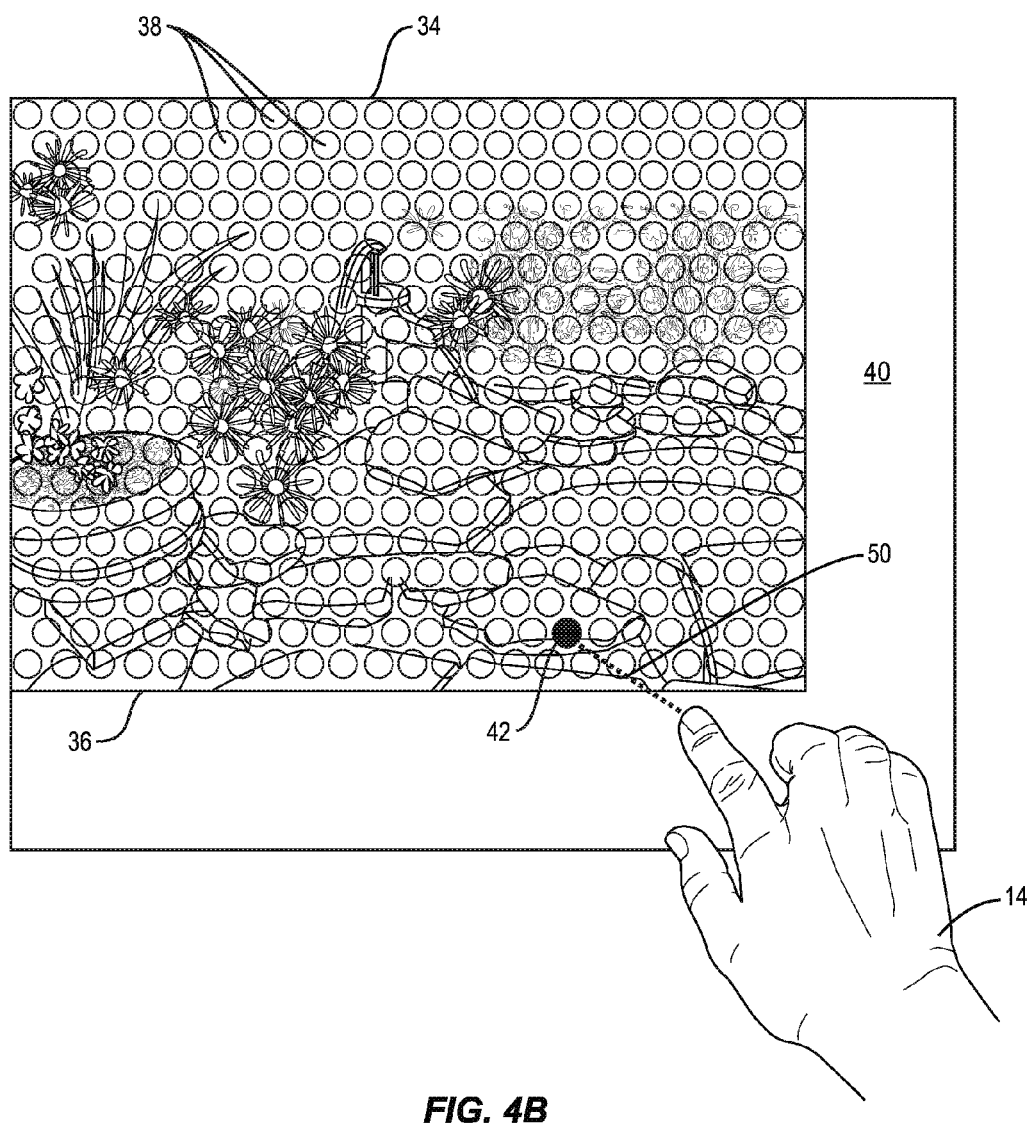
FIG. 4B illustrates a user interface for a picture password proof of knowledge where a grid element within an image is highlighted in response to user input within a white space at a location offset from a highlighted grid element according to some embodiments of the present disclosure.
Figure 4C:
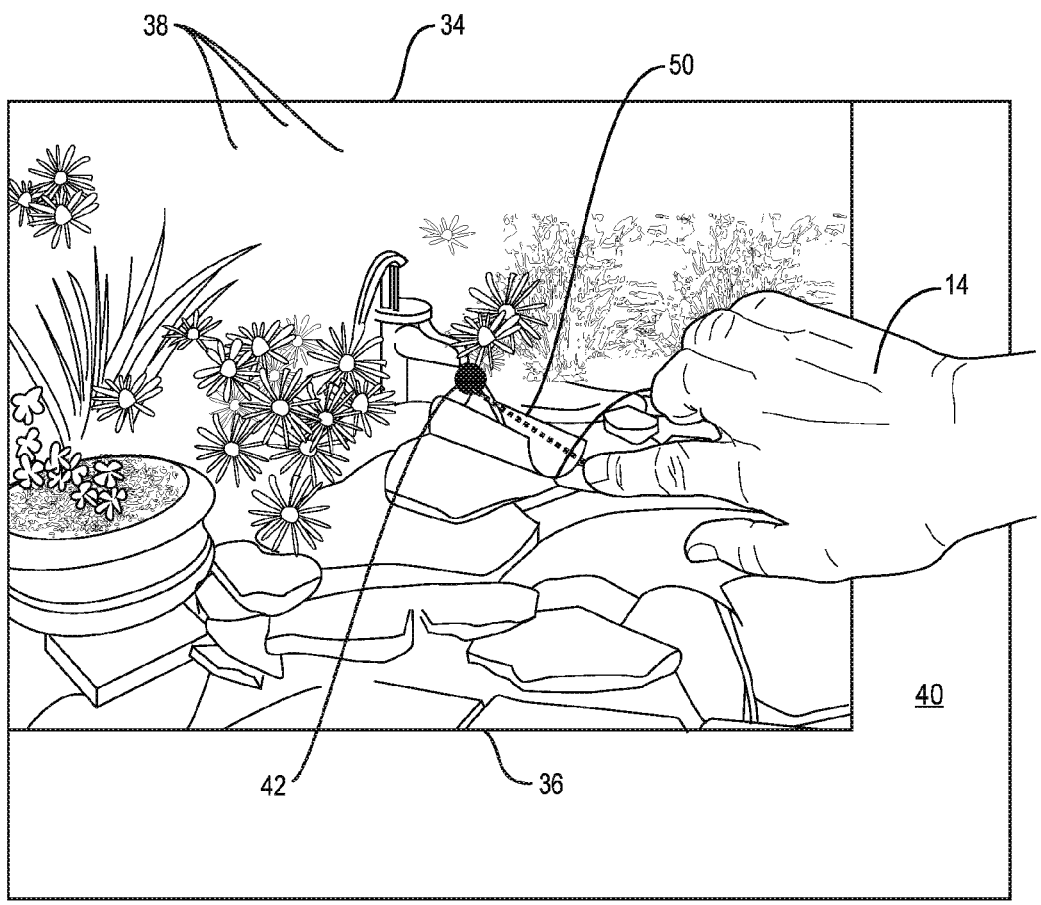
FIG. 4C illustrates the user interface of FIG. 4A but does not display an overlaid grid of elements according to some embodiments of the present disclosure.

FIGS. 4A through 4C illustrate a touch-sensitive display navigation mode (e.g., smartphone navigation mode) for a picture password proof of knowledge that uses relatively small circles as grid elements 38 according to some embodiments of the present disclosure. FIG. 4A shows a highlighted circular grid element 38 (e.g., the presently selected start-point 42) that is offset from the location of an input defined by, for example and without limitation, the location of a mouse input or touch input (e.g., the user's finger) provided by the input object 14.

In this embodiment, the snapped-to circular grid element 38 (e.g., the presently selected start-point 42) is primarily to the left of the input object 14 in accordance with a predetermined offset 50. The predetermined offset 50 defines a distance and direction of the highlighted (i.e., selected) grid element 38 (e.g., the presently selected start-point 42) from the location of the mouse/touch input. For instance, the predetermined offset 50 may be defined as a number of grid elements 38 up/down and a number of grid elements 38 left/right. In the illustrated example, the predetermined offset 50 of the highlighted circular grid element 38 (e.g., the presently selected start-point 42) from the location of the input is three grid elements 38 up and three grid elements 38 to the left. In some embodiments, the predetermined offset 50 is defined as a distance and direction. For example, the predetermined offset 50 may be determined by calculating an absolute distance in pixels from a location of an input. The circular grid element 38 that is nearest that offset point is snapped-to (e.g., highlighted/selected). In some embodiments, the direction from the location of an input to the location of a snapped-to grid element 38 can be offset to the right, top, bottom, or combinations thereof.

FIG. 4B illustrates a snapped-to (e.g., highlighted/selected) circular grid element 38 that is offset from the location of a touch input in the white space 40. The offset in FIG. 4B corresponds to the same value of the predetermined offset 50 from FIG. 4A. FIG. 4B shows that the white space 40 compensates for the predetermined offset 50 to enable selection of the start-point 42 located in the periphery of the image 36.

FIG. 4C similarly illustrates the touch-sensitive display navigation mode for a picture password proof of knowledge as shown in FIGS. 4A and 4B. However, in contrast to FIGS. 4A and 4B, the embodiment shown in FIG. 4C does not display the grid elements 38. In this embodiment, an input is used to snap-to a grid element 38 that is not displayed over the image 36.

Figure 5:
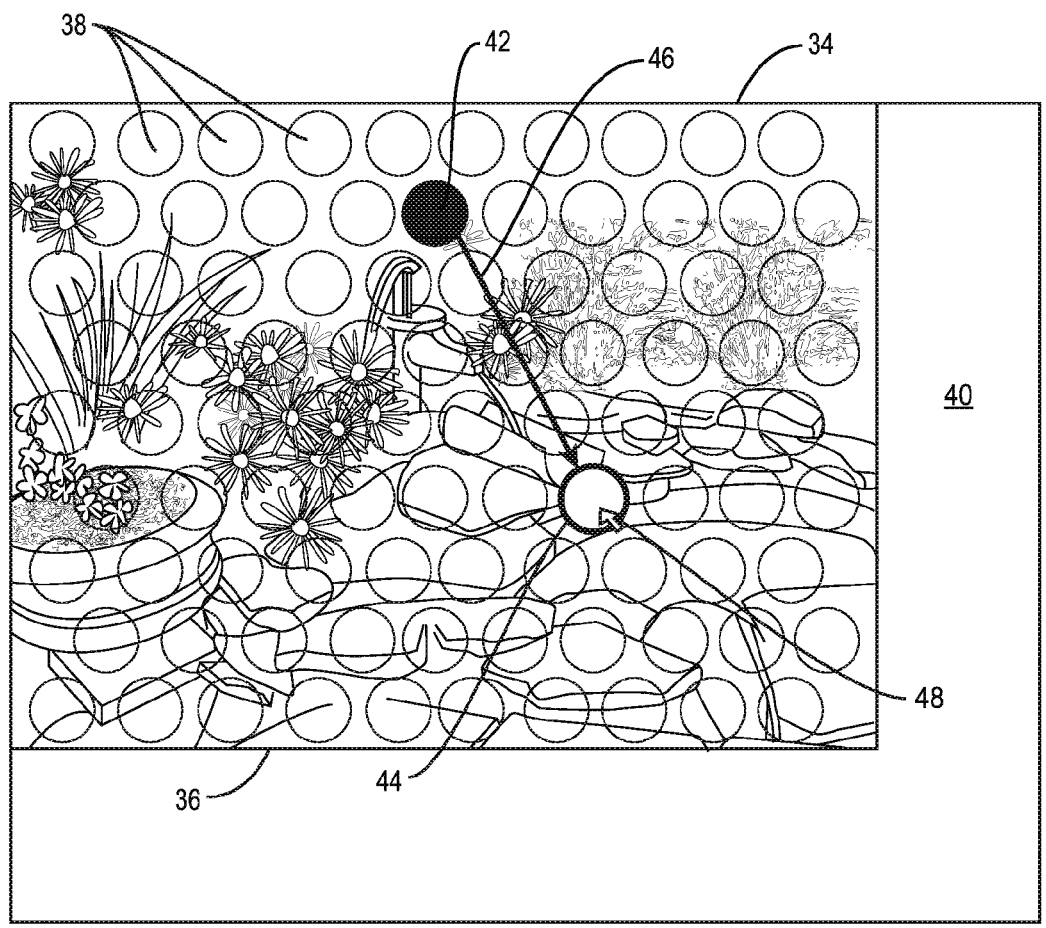
FIG. 5 illustrates the user interface of FIG. 3 with an overlaid grid of relatively large circular grid elements for a standard navigation mode according to some embodiments of the present disclosure.

FIG. 5 illustrates the picture password UI 34 of FIG. 3 but includes an overlaid grid of relatively large circular grid elements 38 for the standard navigation mode according to some embodiments of the present disclosure. The circles of FIG. 5 are relatively large compared to, for example, the relatively smaller circles shown in FIGS. 3, 4A, and 4B. The relatively large circle size of the grid elements 38 can be set as a default size for using the standard navigation mode. Here, the snapped-to (e.g., highlighted) grid element 38 (i.e., the end-point 44) is a relatively larger circle size compared to the grid elements 38 from FIG. 3, and is directly under the pointer 48 as defined by, for example and without limitation, the location of a mouse input or touch input (e.g., based on the location of a user's finger). Similar to FIG. 3, FIG. 5 shows a drag path from the beginning point of a stroke (i.e., the start-point 42) and a prospective end-point 44 of the stroke, which is detected as a line action that causes a line 46 to be drawn between the two points 42, 44.

A prospective start-point or prospective end-point refers to a highlighted grid element 38 that is presently selected (i.e., designated) as a possible start-point 42 or end-point 44 but can change to another grid element 38 until the grid element 38 is set as the start-point 42 or the end-point 44.

Figure 6:
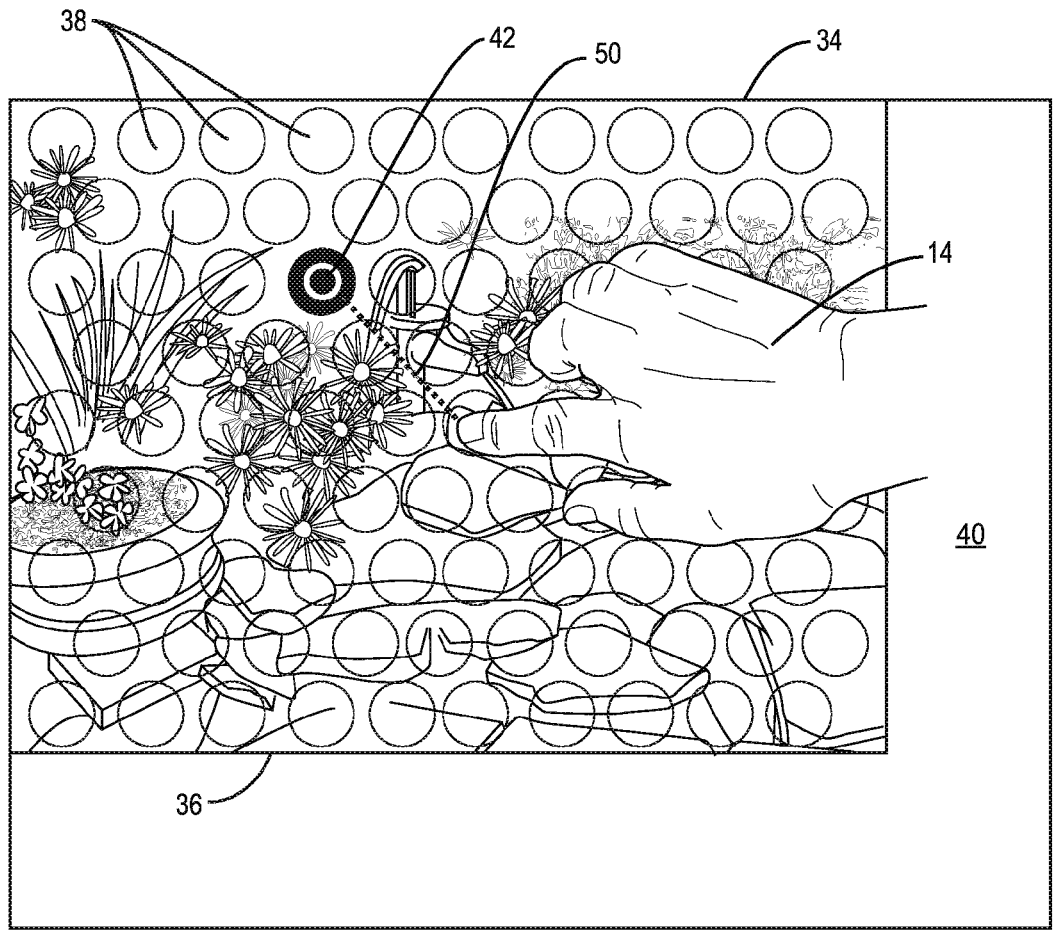
FIG. 6 illustrates the user interface of FIG. 4A with an overlaid grid of relatively large circle elements for a touch-sensitive display navigation mode according to some embodiments of the present disclosure.

FIG. 6 illustrates the picture password UI 34 from FIG. 4A but includes an overlaid grid of relatively large circular grid elements 38 for the touch-sensitive display navigation mode. The circles of FIG. 6 are relatively large compared to, for example, the relatively smaller circles shown in FIGS. 3, 4A, and 4B. The relatively large circle size of the grid elements 38 can be set as a default size for using the smart phone navigation mode. Here, the snapped-to (e.g., highlighted) grid element 38 is a relatively larger circle size and is offset from the location of an input action as defined by, for example and without limitation, the location of a mouse input or touch input (e.g., based on the location of a user's finger provided by the input object 14). As shown, the snapped-to circular grid element 38 (i.e., the start-point 42) is primarily offset to the left of the touch input provided by the input object 14.

The predetermined offset 50 shown in FIG. 6 may have the same or a different value as the predetermined offset 50 from FIG. 4A. As shown, the snapped-to circular grid element 38 is located to the left two circles and up two circles from the location of the input provided by the input object 14. However, the predetermined offset 50 does not necessarily correspond to a number of grid elements 38. For example, a snapped-to point can be determined by calculating a point on the image 36 that is an absolute distance in pixels from the touch input. The circular grid element 38 that is nearest that point is snapped-to (e.g., highlighted). In some embodiments, the direction from the location of an input to the location of a snapped-to grid element 38 can be offset to the right, top, bottom, or combinations thereof.

Notably, the predetermined offset 50 may be a function of one or more criteria (e.g., a mode of operation of the electronic device 10, a size of the touch-sensitive display 12, whether or not the touch-sensitive display 12 is touch-sensitive, etc.). However, in other embodiments, the predetermined offset 50 is fixed.

In some embodiments, the size of the grid elements 38 can be set by a Requesting Party (RQP) such as a user of the picture password or a third party relying on the picture password for proof of knowledge (e.g., a Relying Party (RP) such as a bank). For example, the size of the grid elements 38 can be established based on a simple yes/no decision made by a RQP such as a user when registering a picture password to a user's account.

In some embodiments, the navigation modes may be set by a predetermined number of inputs from a user or a third party, set based on the display device, and/or set based on policy settings. For example, a user can toggle the touch-sensitive display navigation mode on/off by using controls located in a control panel area (not shown) that is displayed beside the image 36. In some embodiments, the control panel area can be included within the white space 40. In response to toggling the touch-sensitive display navigation mode on/off, the predetermined offset 50 can change between having a value of zero (standard mode) and having a non-zero value (smartphone mode).

In some embodiments, the touch-sensitive display navigation mode may be turned on/off automatically (i.e., activated) based on a detected display screen size. In some embodiments, a RQP can enable/disable this functionality via a policy setting.

In some embodiments, the touch-sensitive display navigation mode may be activated when the display corresponds to a touch-sensitive display 12 and the size of the touch-sensitive display 12 is less than a predetermined threshold. A predetermined threshold may include, for example, a size of a touch-sensitive display 12 that is less than an average size of a laptop or a tablet computer.

Figure 7:
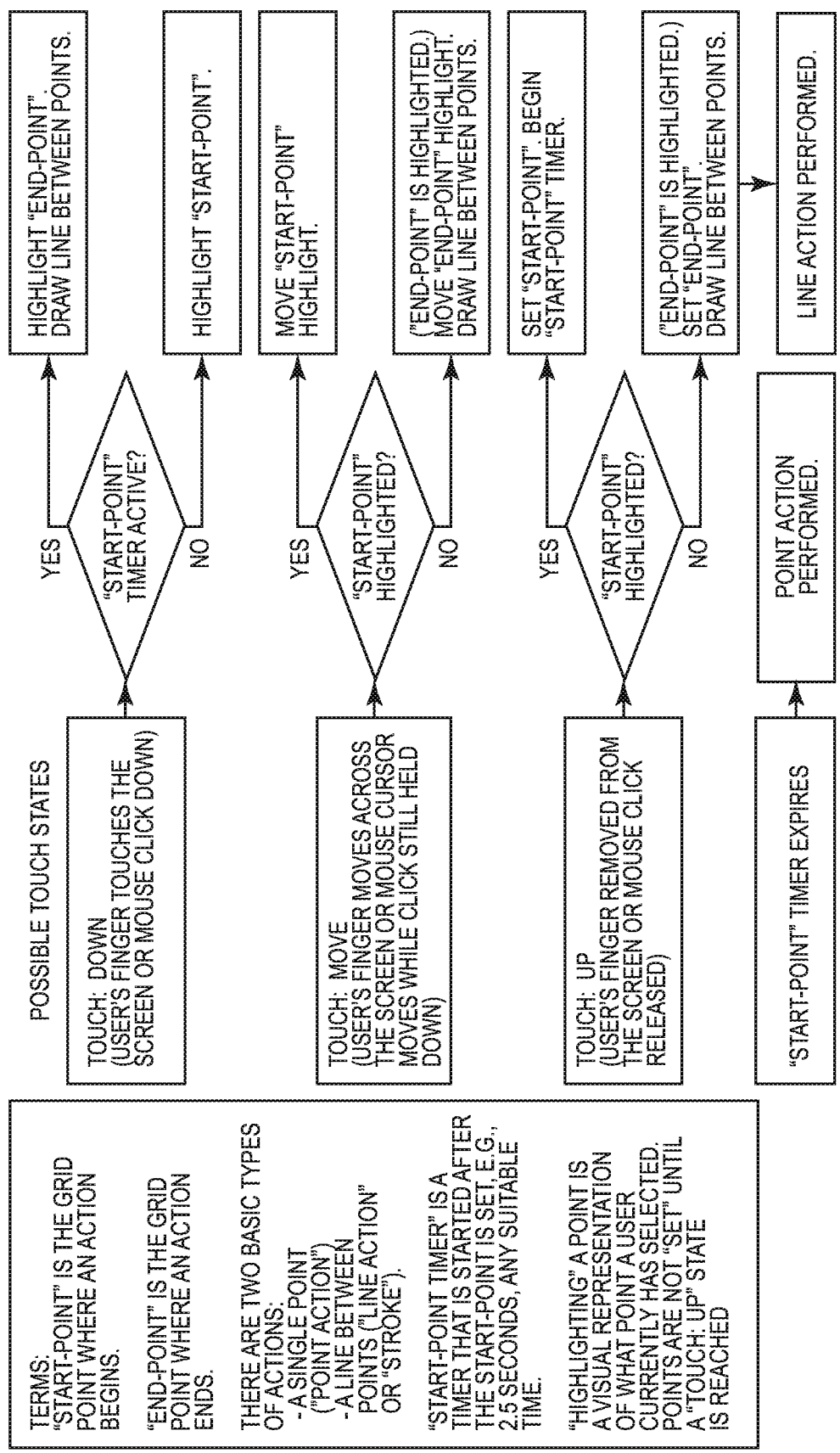
FIG. 7 illustrates the operation of an electronic device to process inputs for a picture password proof of knowledge according to some embodiments of the present disclosure.

FIG. 7 illustrates a navigation routine executed by a processor of an electronic device (e.g., the electronic device 10) with a touch-sensitive display 12 that operates in a touch-sensitive display navigation mode according to some embodiments of the present disclosure. As indicated above, an input action used for a picture password may include a start-point 42 and an end-point 44. The start-point 42 is a point on a grid that corresponds to a designated grid element 38 where an input action begins. The end-point 44 is a grid point on the grid that corresponds to a designated grid element 38 where an input action ends.

In some embodiments, an input action can correspond to one of two basic types of actions. The first is a single point action (i.e., a "point action"). The second is a line between two points (i.e., a "line action" or a "stroke"). A "start point timer" is a timer that is activated (i.e., started) after the "start-point" is set. This timer expires after a predetermined time (e.g., without limitation, 2.5 seconds or any suitable time). "Highlighting" a point means a suitable visual representation of a grid element 38 that a user currently has selected. Points are not "set" until a "Touch: Up" state of an input is reached. In this example, the inputs are touch inputs. However, this process is equally applicable to click inputs.

As shown in FIG. 7, in some embodiments, there are four possible states of the user interface including Touch: Down, Touch: Move, Touch: Up, and "Start Point Timer Expires." In some embodiments, all or a combination of some of these states are implemented according to embodiments of the present disclosure.

The Touch: Down state is entered in response to a touch down input. The touch down input occurs when an input object 14 (e.g., a user's finger) touches a location on the touch-sensitive display 12. The Touch: Move state is entered in response to a touch move input. A touch move input occurs when an input object 14 moves across the touch-sensitive display 12 while maintaining contact with the touch-sensitive display 12 after a touch down input. The Touch: Up state is entered in response to a touch up input. A touch up input occurs when the input object 14 is removed from the touch-sensitive display 12. The Start Point Timer Expires state is entered in response to the start point timer expiring after a predetermined amount of time.

Different input actions can be detected by processing one or more inputs according to these states. For example, in response to a touch down input, the electronic device 10 enters the Touch: Down state and performs a corresponding routine or process. In particular, the electronic device 10 highlights a grid element 38 corresponding to the touch down input. Notably, if the predetermined offset 50 is non-zero, then the highlighted grid element 38 is offset from the location of the touch down input by the predetermined offset 50. If the start point timer has not been started/activated, then the highlighted grid element 38 is a prospective start-point 42 for an input action. Conversely, if the start-point timer has already been started/activated, then the highlighted grid element 38 is a prospective end-point 44 for the input action. In some embodiments, a line 46 is displayed from a previously set start-point 42 for the input action to the prospective end-point 44 for the input action. As indicated above, a prospective start-point 42 or prospective end-point 44 refers to a highlighted grid element 38 that is presently selected (i.e., designated) as a possible start-point 42 or end-point 44 but can change to another grid element 38 until the grid element 38 is set as the start-point 42 or the end-point 44.

In response to a move input, the electronic device 10 enters the Touch: Move state and performs a corresponding routine or process. In particular, a highlight associated with a grid element 38 is moved to another grid element 38 in accordance with a movement of the input in the Touch: Move state. For example, if the highlighted grid element 38 corresponds to a prospective start-point 42, then the prospective start-point highlight (and thus the prospective start-point 42 itself) is moved in accordance with a movement of the input to another grid element 38. On the other hand, if the highlighted grid element 38 does not correspond to a prospective start-point 42, then the highlighted grid element 38 corresponds to a prospective end-point 44 that moves in accordance with the movement of the input. In some embodiments, a line 46 is displayed from a previously detected start-point 42 to the (moved) prospective end-point 44 for the input action.

In response to a touch up input, the electronic device 10 enters the Touch: Up state and performs a corresponding routine or process. In the Touch: Up state, either a prospective start-point 42 is set as a start-point 42 for an input action or a prospective end-point 44 is set as an end-point 44 for an input action, depending on whether the start-point timer is active (i.e., has not expired). For example, if a highlighted grid element 38 corresponds to a prospective start-point 42, then, in response to a touch up input, the prospective start-point 42 is set as the start-point 42 and the start-point timer is started. On the other hand, if the highlighted grid element 38 corresponds to the prospective end-point 44, then, in response to the touch up input, the prospective end-point 44 is set as the end-point 44 of the input action and a line 46 is displayed from a previously detected start-point 42 for the input action to the end-point 44 for the input action. The input action is recorded as a line action (e.g., a stroke).

Lastly, in response to expiration of the start-point timer, a point action is detected. In other words, in response to a touch up input and subsequent expiration of the start-point timer before another input is received, the grid element 38 identified as the prospective start-point 42 is detected as the point/location of a point action.

Figure 8:
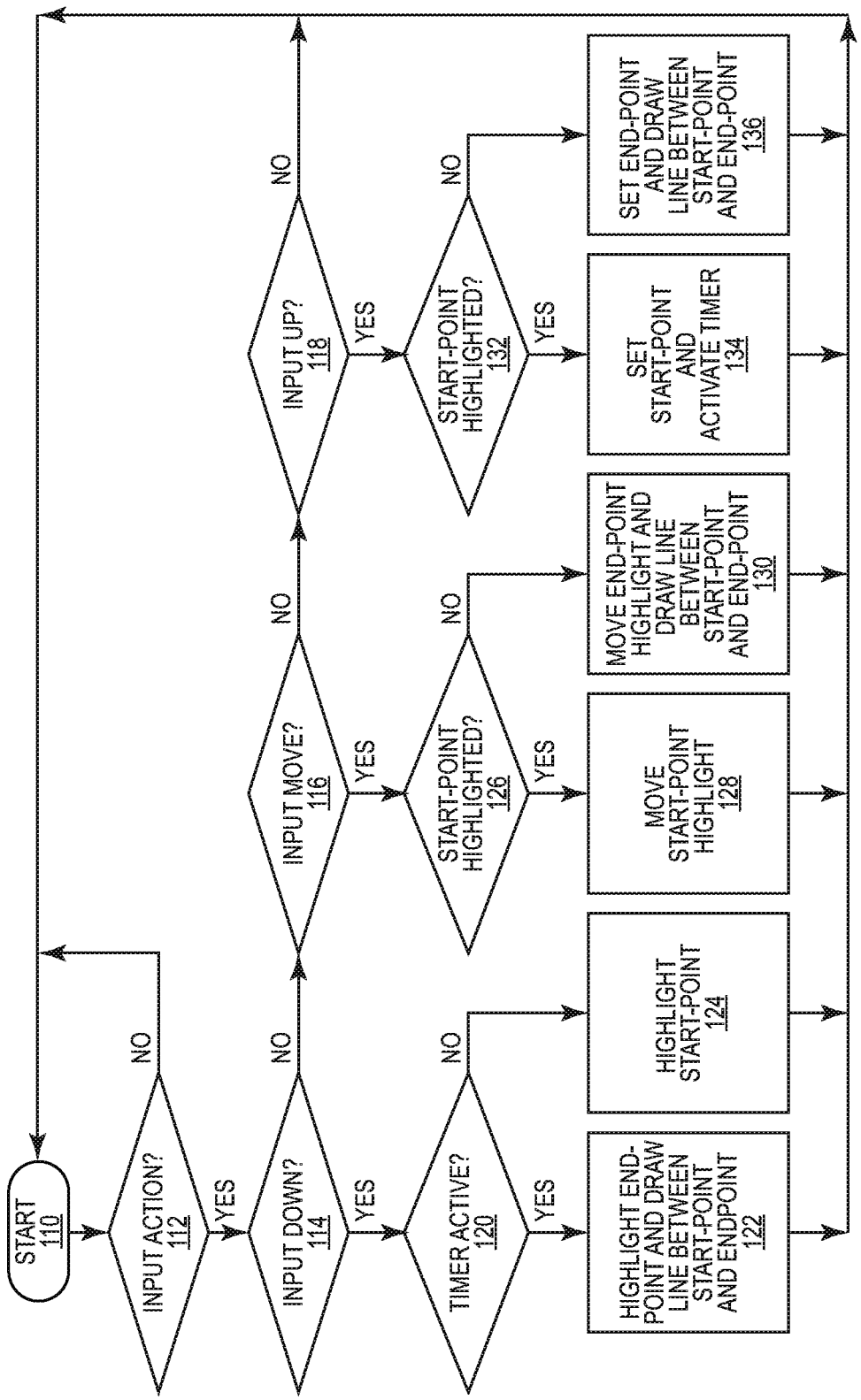
FIG. 8 is a flowchart that illustrates the operation of an electronic device according to some embodiments of the present disclosure.

FIG. 8 is a flowchart showing a different representation of FIG. 7 according to some embodiments of the present disclosure. As shown, the electronic device 10 awaits an input for the picture password via an input device (e.g., the touch-sensitive display 12) (steps 110, 112). When an input is received, a determination is made to identify a state of the input as either a down input, a move input, or an up input (steps 114, 116, 118).

If the input is a down input (e.g., a touch/click down), then a determination is made about whether a predetermined timer is active (step 120). If the predetermined timer is active, the highlighted grid element 38 is designated as a prospective end-point 44 for the input action and a line 46 is displayed between a previously detected start-point 42 for the input action and the prospective end-point 44 to thereby display a prospective line action to the user (step 122). If the predetermined timer is not active, a highlighted grid element 38 (a grid element 38 highlighted by the input down action) is designated as a prospective start-point 42 for an input action (step 124).

If the input is a move input (step 116), then a determination is made about whether a prospective start-point 42 is currently highlighted (step 126). If a prospective start-point 42 is currently highlighted, the highlighted prospective start-point 42 is moved to another grid element 38 in accordance with the move input (i.e., move the highlight to the grid element 38 corresponding to the move input taking into account the predetermined offset 50 if applicable) (step 128). When the prospective start-point 42 is not highlighted and the prospective end-point 44 is highlighted (i.e., a start-point 42 is set), the highlighted prospective end-point 44 is moved to another grid element 38 in accordance with the move input and a line 46 is displayed between a start-point 42 for the input action and the prospective end-point 44 (step 130).

If the input is an up input (step 118), then a determination is made about whether a prospective start-point 42 is highlighted (step 132). If the prospective start-point 42 is highlighted, the grid element 38 corresponding to the prospective start-point 42 is set as the start-point 42 for an input action and the start-point timer is activated (step 134). If the prospective start-point 42 is not highlighted and the prospective end-point 44 is highlighted, the grid element 38 corresponding to the prospective end-point 44 is set as the end-point 44 for a line action and a line action is detected to draw a line 46 between a start-point 42 and the end-point 44 (step 136). After steps 122, 124, 128, 130, 134, and 136, the process returns to step 110 to wait for the next input. Notably, while not illustrated in FIG. 8, after the predetermined timer is activated, the electronic device 10 monitors for the expiration of the predetermined timer. If the predetermined timer expires before the end-point 44 for the input action is set or at least a prospective end-point 44 is selected, the start-point 42 is identified as the point for a point input.

Figure 9:
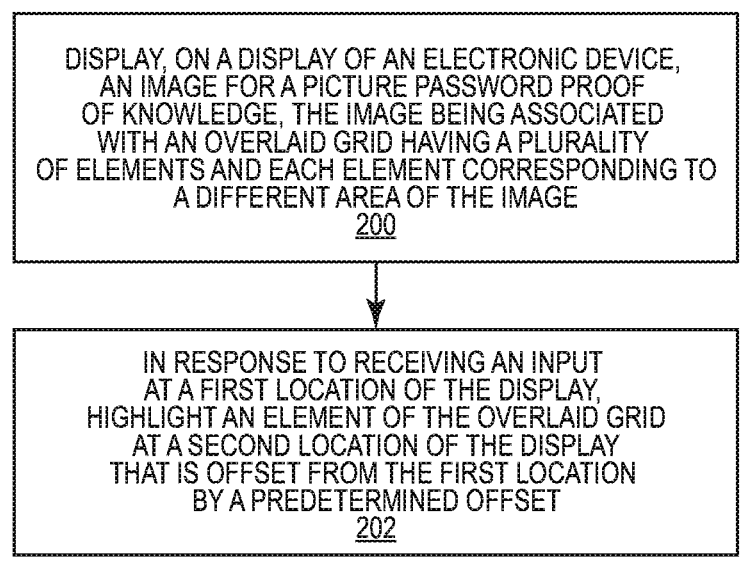
FIG. 9 is a flowchart illustrating the operation of an electronic device for providing a picture password proof of knowledge according to some embodiments of the present disclosure.

FIG. 9 is a flowchart illustrating a method of operation of an electronic device (e.g., the electronic device 10) to process an input for a picture password proof of knowledge according to some embodiments of the present disclosure. Embodiments include displaying, on a display of the electronic device 10, an image 36 for the picture password proof of knowledge (step 200). The image 36 is associated with an overlaid grid having a plurality of grid elements 38, and each grid element 38 corresponds to a different (e.g., distinct) area of the image 36. In response to receiving an input at a first location of the display, the electronic device 10 highlights an element of the overlaid grid at a start-point 42 of the display that is offset from the first location by a predetermined offset 50 (step 202). In some embodiments, the input is processed for a picture password proof of knowledge during an enrollment phase to define user knowledge. In some embodiments, the input is processed for a picture password proof of knowledge during a use phase to authenticate a user that proves the knowledge The disclosed embodiments detailed above may be further improved by using modified inputs. For example, a displayed image may have multiple input layers that are separate and distinct from each other, rather than the one single flat input layer as used by the embodiments shown in FIGS. 3 through 6. The modified inputs may be associated with the multiple input layers such that an unmodified input acts on a first input layer and a modified input acts on a separate and distinct second input layer. The modified input may be activated by, for example and without limitation, performing a touch-and-hold gesture at a predetermined corner of a touch-sensitive display, activating a hotkey, using touch points, strokes, paths, or a predetermined gesture that does not contact the touch-sensitive display or that applies force on the touch-sensitive display that exceeds a predetermined threshold.

The use of multiple input layers greatly obscures the relationship between finger smudges on the touch-sensitive display and input actions associated with a picture password because a user may not be able to determine what finger smudge belongs to a particular input layer. For example, a legitimate user could activate a hotkey to input a first touch gesture on a first input layer of the image. The hotkey could then be deactivated to input a second touch gesture on a second input layer of the same image. The first and the second gestures corresponding to input actions may leave different finger smudges on the touch-sensitive display. A malicious user cannot thwart the picture password authentication system by simply replicating the finger smudges because the malicious user cannot determine what layer of the image is associated with a finger smudge corresponding to a gesture for a picture password. This embodiment also avoids line intersections caused by line actions because, for example, drag paths can be drawn on multiple input layers without physically touching the touch-sensitive display. In some embodiments, an input layer could be predetermined to receive input from a capacitive stylus that would not leave smudges even though physical contact may be made.

Figure 10:
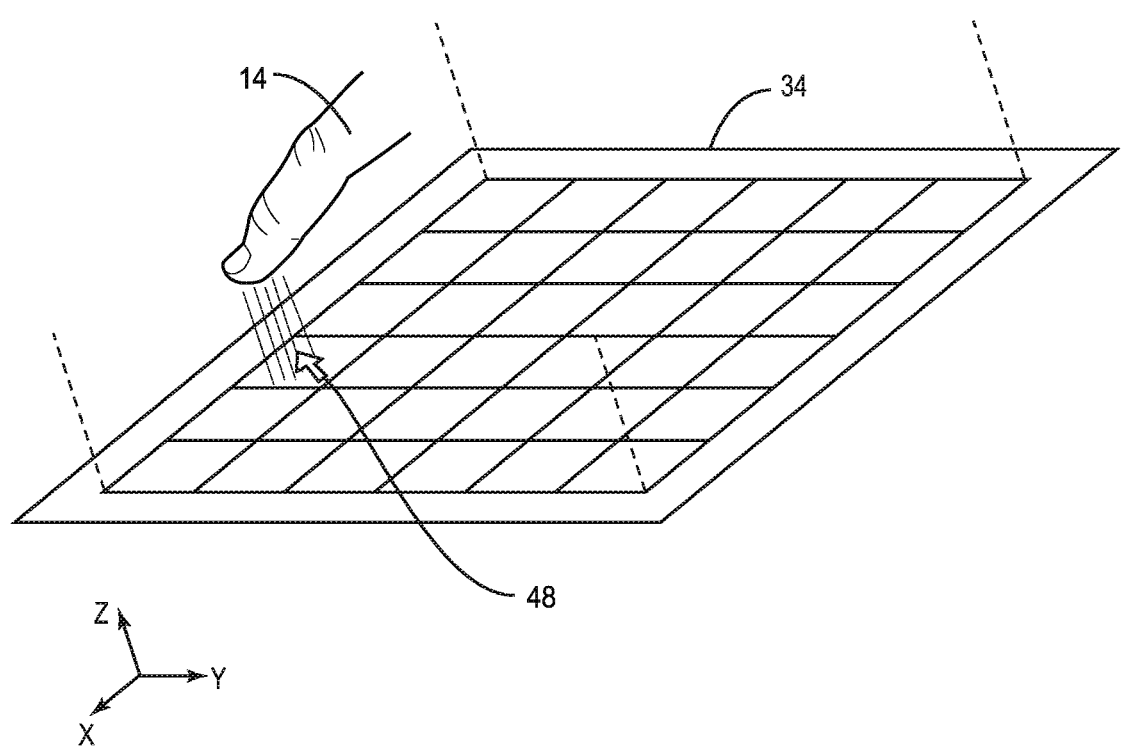
FIG. 10 illustrates a user interface for a picture password proof of knowledge that receives hover inputs according to some embodiments of the present disclosure.

In some embodiments, a modified input may avoid leaving any finger smudges on a touch-sensitive display by using a hover input (i.e., an input in a hover state). For example, FIG. 10 illustrates a user interface for a picture password proof of knowledge that receives a hover input that does not require physical contact with a touch-sensitive display 12 according to some embodiments of the present disclosure. As shown, the electronic device 10 that provides the picture password UI 34 accepts an input action without requiring contact on the touch-sensitive display 12 from the input object 14. As such, the security of a picture password is further increased because a malicious user cannot rely on finger smudges left by a legitimate user to thwart an authentication system. In some embodiments, using multiple input layers increases entropy by providing a "special stroke" which is a "jump over" another stroke. For example, a user can literally lift his/her finger over another prior stroke. For example, a SAMSUNG® GALAXY smartphone can follow a user's finger in mid-air without contacting the touch-sensitive display 12. This increases the vocabulary and, hence, the entropy of a picture password. Alternatively, if the input object 14 is a mouse, as opposed to a user's finger on a touch-sensitive display 12, then the "jump over" or "fly over" can be selected with, for example and without limitation, clicking a right mouse button. This method increases the available "alphabet" (i.e., vocabulary) for a picture password, thereby increasing the entropy associated with any input action, such as a touch point or stroke.

FIG. 11 is a flowchart illustrating a method for a picture password proof of knowledge that accepts hover inputs to prevent finger smudges according to some embodiments of the present disclosure. As shown, the electronic device 10 awaits an input from an input device (e.g., a user's finger on a touch-sensitive display 12) (steps 300 and 302). When an input is received, a determination is made to identify the type of input as either an input down, an input move, an input up, a hover down, a hover move, or a hover up (steps 304, 306, 308, 310, 312, 314). Notably, the touch/click inputs are, in this example, one input layer, and the hover inputs are, in this example, another input layer.

When the input is in an input down state (step 304), an input down routine is executed (step 316). When the input is in an input move state (step 306), an input move routine is executed (step 318). When the input is in an input up state (step 308), an input up routine is executed (step 320). In some embodiments, the routines for the input down state, the input move state, and the input up state correspond to the same or similar routines executed by the electronic device 10 for corresponding states as previously described with reference to the embodiment shown in FIG. 8.

When the input is in a hover down state (step 310), a hover down routine is executed (step 322). When the input is in a hover move state (step 312), a hover move routine is executed (step 324). Lastly, when the input is in a hover up state (step 314), a hover up routine is executed (step 326). After any input routine is complete, the process returns to start (step 300) to wait for another input. In some embodiments, the hover down routine, the hover move routine, and the hover up routine are the same as for the input down routine, the input move routine, and the input up routine described above with respect to FIG. 8. However, the present disclosure is not limited thereto.

Implementations of the embodiments detailed above provide improved threat controls. For example, it is well known that banking systems that provide websites for users to login and access their secured information seek to prevent "phishers" from creating a similar fake website meant to steal authentication information from unsuspecting users (i.e., an unsuspecting user may have their username and password stolen when unintentionally logging-in to a fake website to access his/her account). To remedy this problem, many banking systems today may require a user to preselect a picture from a limited set of pictures provided by the banking system as a security image which the banking system later shows the user as a means to confirm for the user that he/she is logging into the bank's authentic site and not a fake site. This mechanism discourages "phishing" because the "phishers" cannot know with certainty the preselected picture, although they could readily guess.

In contrast, the disclosed picture password mechanisms improve threat controls against "phishing" attacks. For example, in some embodiments, a picture password system based on these embodiments permits a user to select his/her own picture from a set of unique pictures provided by the user or a web server. By using the user's own picture, the number of potential pictures is greater than the limited set of pictures provided by banking systems using the conventional approach described above, which in turn improves protection against "phishing" attacks. The selected picture may be designated as the image 36 used for the picture password proof of knowledge. Since the user selects the picture from a set of unique pictures provided by the user or web server, the "phishers" will not likely know or guess the preselected unique picture.

Robot threat controls could also be improved based on the concepts disclosed herein. As indicated above, prior Completely Automated Public Turing test to tell Computers and Humans Apart (CAPTCHA) systems may seek to prevent a logon by a "robot" by creating an image of two words, at least one of which is distorted, and asking the user to type in what he/she reads. The distorted word(s) can be interpreted by a human but not by a robot.

In some embodiments, several anti-robot methods could be employed prior to entering a picture password or changing a picture password. For example, FIG. 12 illustrates a user interface for providing robot threat control by displaying prompt(s) associated with input action(s) on an image according to some embodiments of the present disclosure. As shown, a logon by a robot can be prevented by using a "hint stage." For example and without limitation, a user or third party may pre-provide or pre-select one or more images 52 that contain various other images or objects such as things (e.g., a bicycle, a car, or a fence), persons (e.g., Joe, Mary, or Sally) and/or other animals (e.g., two birds, a dog, a cat). The user or third party may also predefine one or more hints 54 (e.g., without limitation, "touch the turtle on the right"), and/or predefine one or more input actions associated with the hints 54 and the one or more images 52. Hence, the one or more images 52 and/or their objects are associated with the one or more hints 54 and the one or more input actions to provide a robot threat control prior to enabling entry of a picture password or enabling the user to change his/her picture password.

During authentication, prior to logging-in for entering a picture password, the electronic device 10 displays the one or more images 52 and the one or more predefined hints 54. The user can read the predefined hint(s) 54 and then perform the one or more input actions on the images 52 (e.g., using the input object 14 to touch the rightmost turtle object in the image). This "hint stage" requires that a robot must both interpret the English language hint 54 and interpret the images 52 and/or objects being displayed, the combination of which is nearly impossible for a robot to achieve. For example, if a robot performs an action that is inappropriate to a displayed hint 54, then this is a strong indication of a screen scraper robot that is replaying the input action associated with a previous hint 54. This indication can be signaled to a web service as a probable compromise of a user's picture password.

Figure 13:
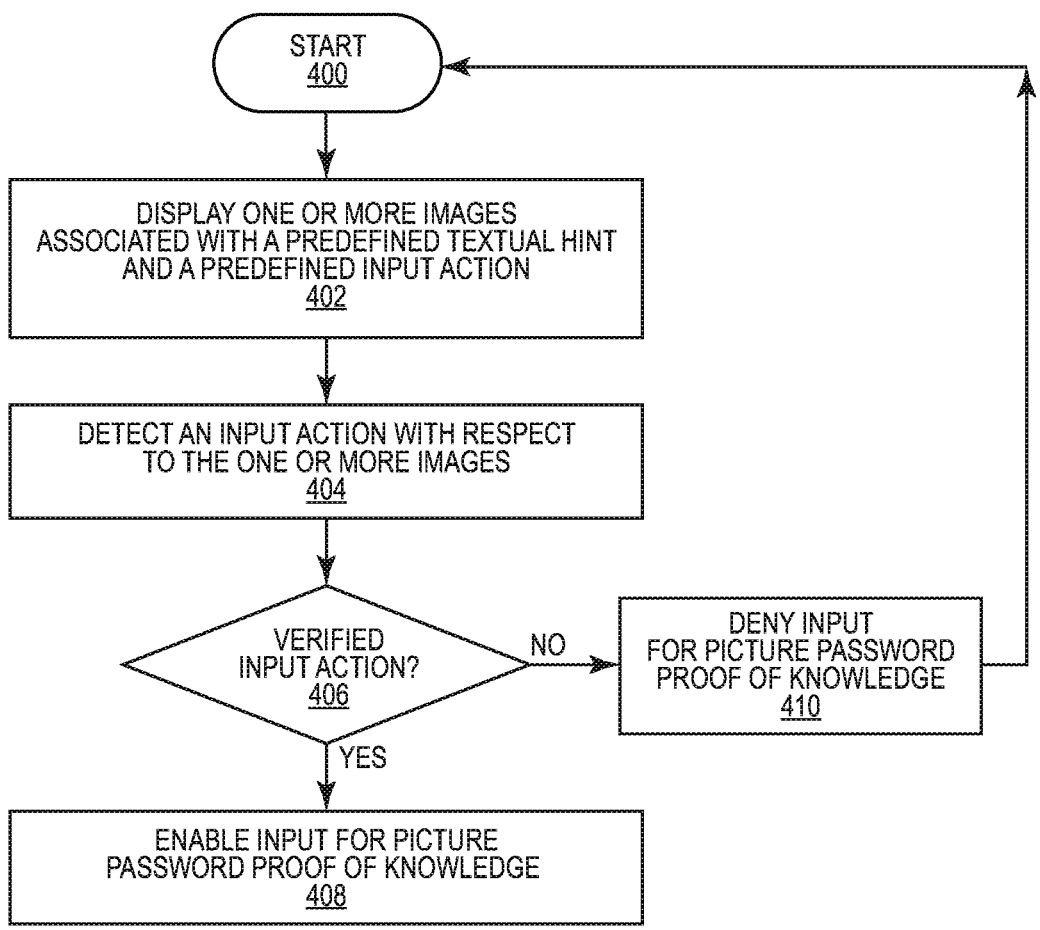
FIG. 13 is a flowchart illustrating a method for providing robot threat controls by displaying a prompt(s) associated with an input action(s) on an image according to some embodiments of the present disclosure.

FIG. 13 is a flowchart illustrating a method for providing robot threat controls by displaying prompt(s) associated with input action(s) on an image according to some embodiments of the present disclosure. In some embodiments, the anti-robot method provides a gatekeeping function for the picture password proof of knowledge. Further, this method may be performed by the electronic device 10 alone or together with a web server. As shown, once the process begins (step 400), one or more images 52 for anti-robot verification are displayed in association with a predefined textual hint 54 (step 402). These images 52 are also associated with a predefined input action(s) required for anti-robot verification. A received input action is detected with respect to the image(s) 52 via one or more inputs in a manner similar to that described above (step 404). The received input action(s) are compared to the predefined input action(s) associated with the image(s) 52 for verification (step 406). If the received input action(s) are verified, the picture password is enabled (i.e., the image 52 for the picture password is displayed and inputs for the picture password are received and processed) (step 408). Hence, successful verification of an input action enables the picture password UI 34. Otherwise, the picture password UI 34 is not enabled (step 410).

In some embodiments, denial of the picture password may be indicated to a user in a pop-up message and/or may result in continued display of the image(s) 52 for the user to retry entering an input action for anti-robot verification.

In some embodiments, the present disclosure improves on threat control mechanisms that merely confirm correct textual answers to predetermined questions. Threat control mechanisms may ask a user questions from a random set to check for proof of knowledge. For example, the user may initially enter answers to a plurality of various questions. Later, the system presents a number of those questions (e.g., "what is your mother's maiden name?") and asks the user to enter a number of answers.

In the "hint stage" of the disclosed embodiments, a user can predefine a plurality of hints 54 (e.g., without limitation, "touch bird on right," "touch fence," or "touch Joe's hat"). Prior to logon with the picture password UI 34, an authentication system can display one or more of those predefined hints 54 at random, the user can read the displayed predefined hint(s) 54, and then the user can perform the input action on a displayed image 52. The increased entropy provided by using picture passwords according to the "hint stage" threat control mechanisms detailed above thus improves the security over prior systems.

Figure 14:
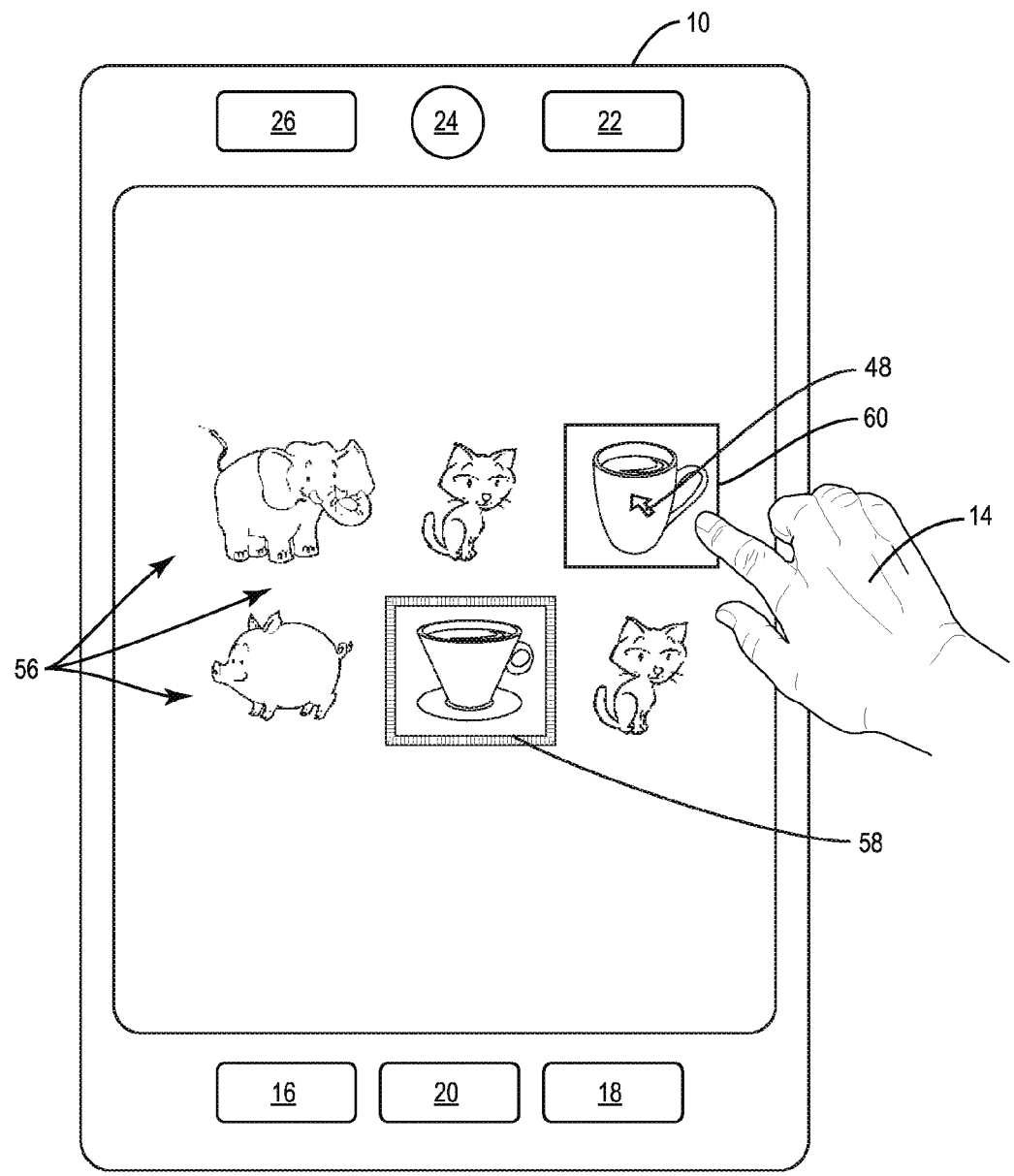
FIG. 14 illustrates a user interface for providing robot threat control by identifying objects that belong to perceptibly distinct and easily recognizable classes according to some embodiments of the present disclosure.

In another embodiment, a web server may provide for the touch-sensitive display 12 of the electronic device 10 to present a set of images or objects of different perceptibly distinct and easily recognized classes. For example, FIG. 14 illustrates a user interface for providing robot threat control by identifying objects that belong to perceptibly distinct and easily recognizable classes according to some embodiments of the present disclosure. As shown, the objective is to select among objects 56 for an item of the same class as a highlighted object 58. In the example shown in FIG. 14, the objective is to select another object 60 that belongs to the same class as the highlighted object 58. For example, a user may click or touch another "cup" in a field of many other things such as "elephant," "pig," "cats," and the like. This embodiment does not require the ability to read text.

Figure 15:
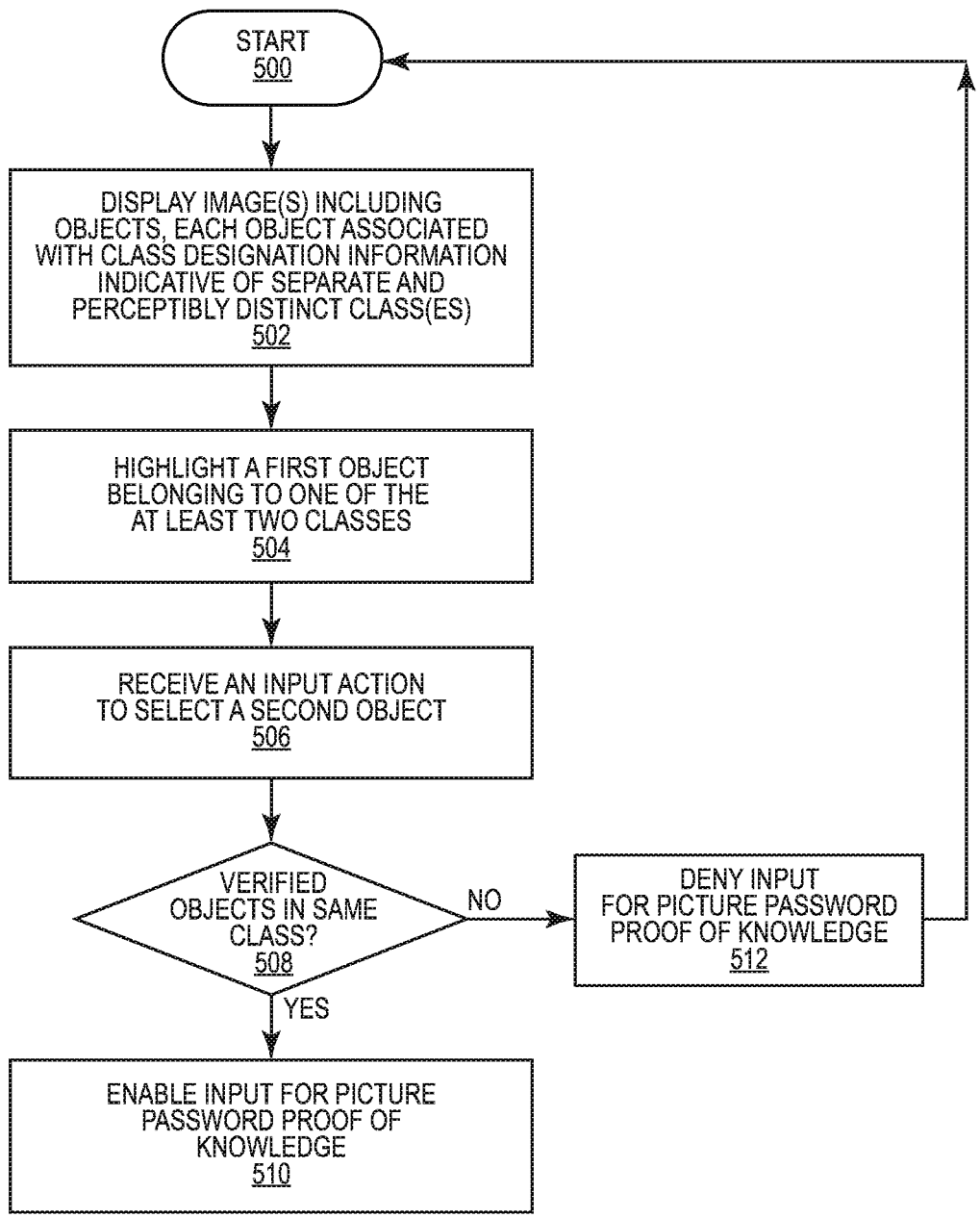
FIG. 15 is a flowchart illustrating a method for providing robot threat control by identifying objects that belong to perceptibly distinct and easily recognizable classes according to some embodiments of the present disclosure.

FIG. 15 is a flowchart illustrating a method for providing robot threat control by identifying objects that belong to perceptibly distinct and easily recognizable classes according to some embodiments of the present disclosure. These anti-robot methods could be employed prior to entering a picture password or changing a picture password. Further, the process of FIG. 15 may be performed by the electronic device 10 alone or together with a web server. As shown, an authentication system waits for a user seeking to login to a picture password UI 34 or seeking to change a picture password image during start (step 500). Then one or more images including several objects 56 are displayed on the touch-sensitive display 12 of the electronic device 10, where each object 56 is associated with class designation information indicative of one of at least two separate and perceptibly distinct classes (step 502). An object 56 that belongs to one of the two classes is highlighted (step 504). The electronic device 10 then receives an input action from a user that selects a second object 60 (step 506). If the highlighted object 58 and the second object 60 are verified as belonging to the same class, then the picture password UI 34 is enabled for input of the picture password for the image for the picture password proof of knowledge (steps 508, 510). Otherwise, the picture password UI 34 is denied from being enabled (steps 508, 512). In some embodiments, denial from the picture password UI 34 may be indicated to a user in a pop-up message and/or may result in continued display of the objects 56 for the user to retry entering an input action.

Figure 16:
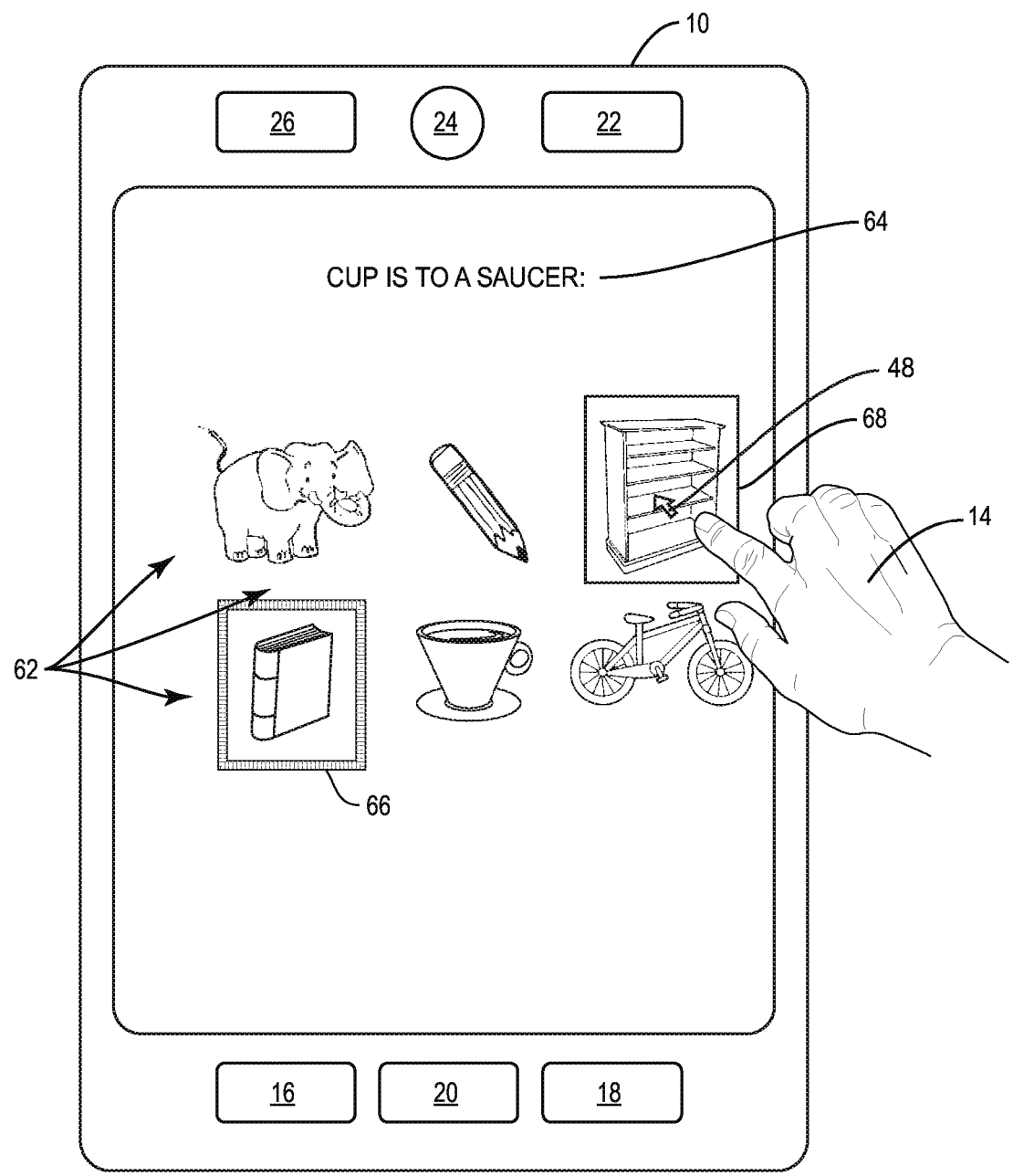
FIG. 16 illustrates a user interface for providing robot threat controls by displaying objects used to satisfy a displayed predetermined textual analogy according to some embodiments of the present disclosure.

FIG. 16 illustrates a user interface for providing robot threat controls by displaying objects used to satisfy a displayed predetermined textual analogy according to some embodiments of the present disclosure. An objective of this embodiment is to complete a simple analogy prior to providing a picture password proof of knowledge. Completing the simple analogy may enable input for the picture password proof of knowledge.

As shown, one or more images comprising a plurality of objects 62 is displayed on the touch-sensitive display 12 of the electronic device 10. Each of the objects 62 belongs to one of at least two separate and perceptibly distinct classes. A predetermined textual analogy 64 displays a "cup is to a saucer" with the common ":" used in well-known testing. A "book" may be a highlighted object 66, and selection of a "bookshelf" object 68 by the input object 14 may be the correct selection to satisfy the predetermined textual analogy 64. This embodiment would put additional burden on a robot attack by requiring selection of an object 68 that belongs to a class of objects related to the highlighted object 66 such that selection of the object 68 satisfies the predetermined textual analogy 64.

Figure 17:
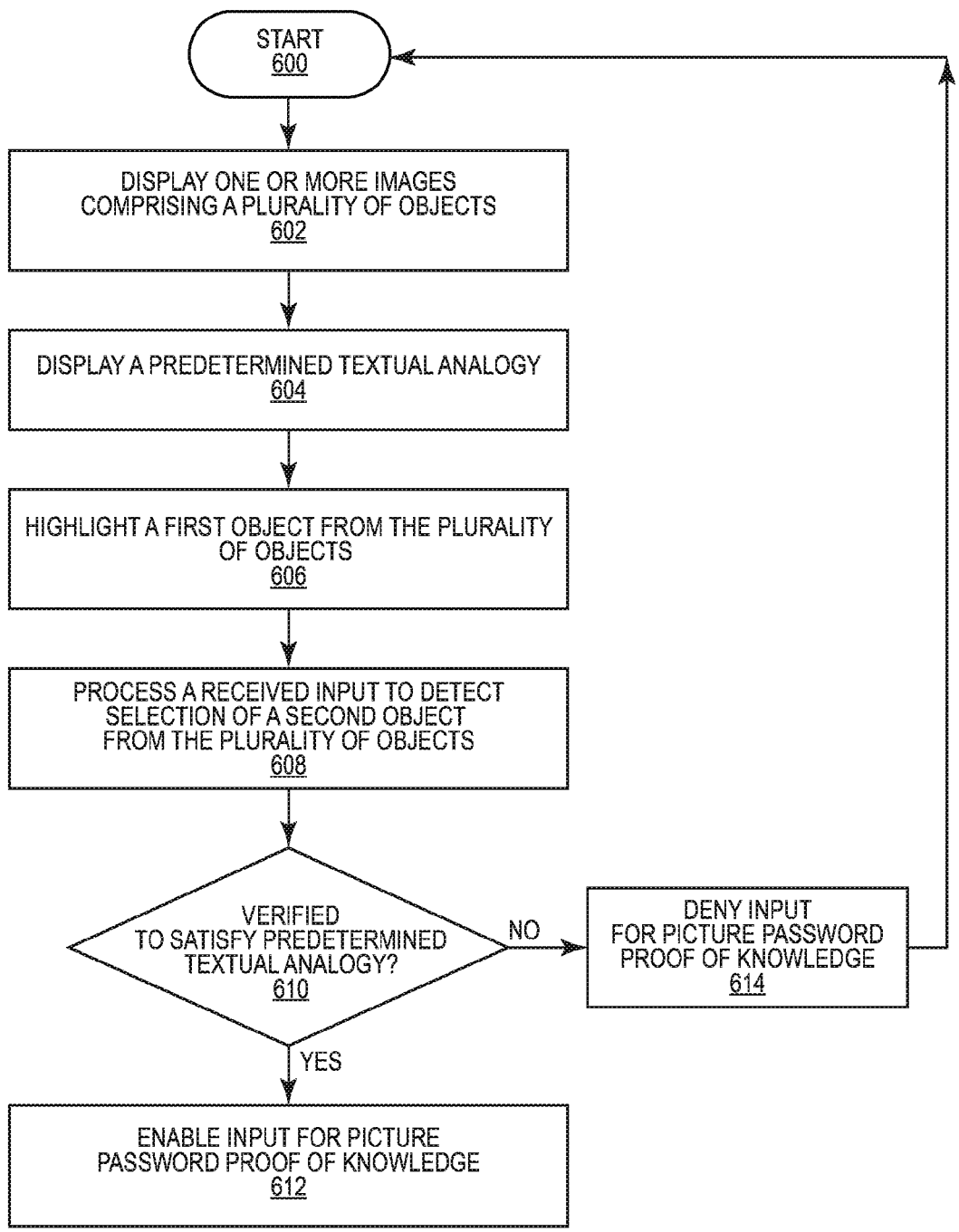
FIG. 17 is a flowchart illustrating a user interface for providing robot threat controls by displaying objects used to satisfy a displayed predetermined textual analogy according to some embodiments of the present disclosure.

FIG. 17 is a flowchart illustrating a user interface for providing robot threat controls by displaying objects used to satisfy a displayed predetermined textual analogy according to some embodiments of the present disclosure. The process of FIG. 17 may be performed by the electronic device 10 alone or together with a web server. These anti-robot methods could be employed prior to entering a picture password or changing a picture password. As shown, an authentication system waits for a user seeking to login to a picture password UI 34 or seeking to change a picture password image (step 600). Embodiments include displaying, on the touch-sensitive display 12 of the electronic device 10, one or more images comprising a plurality of objects 62, each of the objects 62 belonging to one of at least two separate and perceptibly distinct classes (step 602).

A predetermined textual analogy 64 associated with a class of the separate and perceptibly distinct classes of objects 62 is displayed on the touch-sensitive display 12 or the electronic device 10 (step 604). A first object 66 from the plurality of objects 62 is highlighted, the first object belonging to a class of the plurality of separate and perceptibly distinct classes (step 606). The electronic device 10 then processes a received input to detect selection of a second object 68 from the plurality of objects 62 (step 608). In response to detecting the selection of the second object 68, when the selected second object 68 is verified to belong to the class of objects that satisfies the predetermined textual analogy 64, input for the picture password proof of knowledge is enabled (steps 610, 612). When the selected second object 68 is not verified to belong to the class of objects that satisfies the predetermined textual analogy 64, the input for the picture password proof of knowledge may be denied (steps 610, 614). Hence, the picture password UI 34 is enabled depending on whether the selected second object 68 satisfies the predetermined textual analogy 64. In some embodiments, denial from the picture password UI 34 may be indicated to a user in a pop-up message and/or may result in continued display of the plurality of objects 62 for the user to retry entering an input action.

The disclosed embodiments are useful for accessibility even on relatively large displays in connection with a mouse or a touch pad. As a result, the disclosed embodiments can be combined with a relatively larger grid size accessibility solutions in order to create even more effective opportunities to address all display sizes and types.

Figure 18:
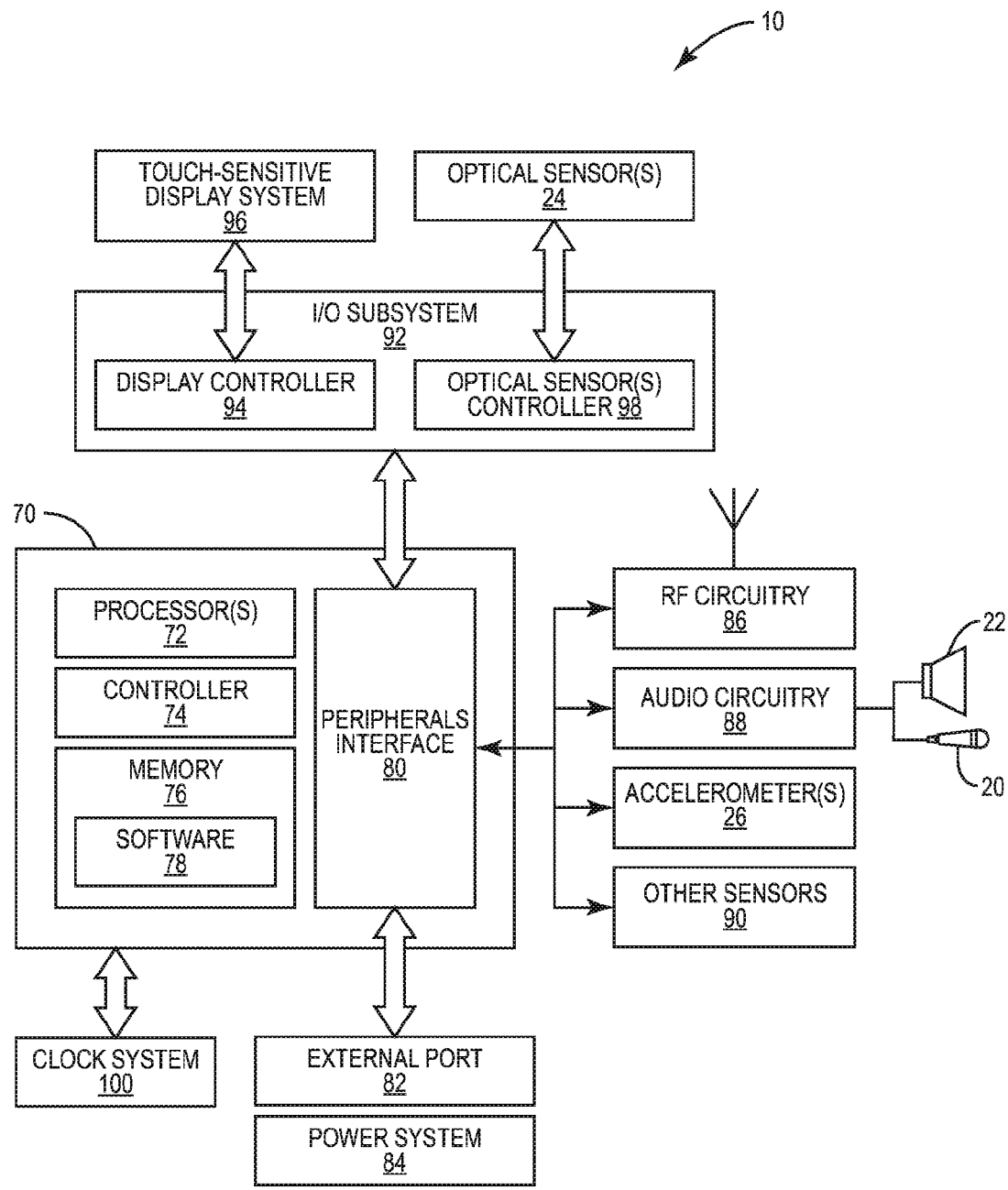
FIG. 18 is a block diagram illustrating a portable electronic device with a touch-sensitive display according to some embodiments of the present disclosure.

FIG. 18 is a block diagram illustrating an electronic device with a touch-sensitive display according to some embodiments of the present disclosure. The electronic device 10 may include other components not shown in FIG. 18, nor further discussed herein for the sake of brevity. One having ordinary skill in the art will understand the additional hardware and software included but not shown in FIG. 18. As shown, electronic device 10 includes a control or processing system 70 that includes one or more processors 72 (e.g., Central Processing Units (CPUs), Application Specific Integrated Circuits (ASICs), and/or Field Programmable Gate Arrays (FPGAs)), a memory controller 74, memory 76 (which may include software 78), a peripherals interface 80, and other components that are not shown for brevity.

The peripherals interface 80 may communicate with an external port 82, which can provide access to a power system 84. Other components in communication with the peripherals interface 80 include Radio Frequency (RF) circuitry 86 (e.g., WiFi and/or cellular communications circuitry) and audio circuitry 88 for the speaker 22 and the microphone 20 of the electronic device 10. Other components in communication with the peripherals interface 80 include the one or more accelerometers 26 and other sensors 90. The peripherals interface 80 may also communicate with an Input/Output (I/O) subsystem 92, which includes a display controller 94 operative to control a touch-sensitive display system 96, which further includes the touch-sensitive display 12 of the electronic device 10. The I/O subsystem 92 also includes an optical sensor(s) controller 98 for one or more optical sensors 24 of the electronic device 10. The I/O subsystem 92 includes other components (not shown) to control physical buttons such as the "exit" button 16 or the "home" button 18. Lastly, a clock system 100 controls a timer for use by the disclosed embodiments as detailed above. As such, FIG. 18 shows components of the electronic device 10 that enables a user to interface with features of the disclosed embodiments.

Figure 19:
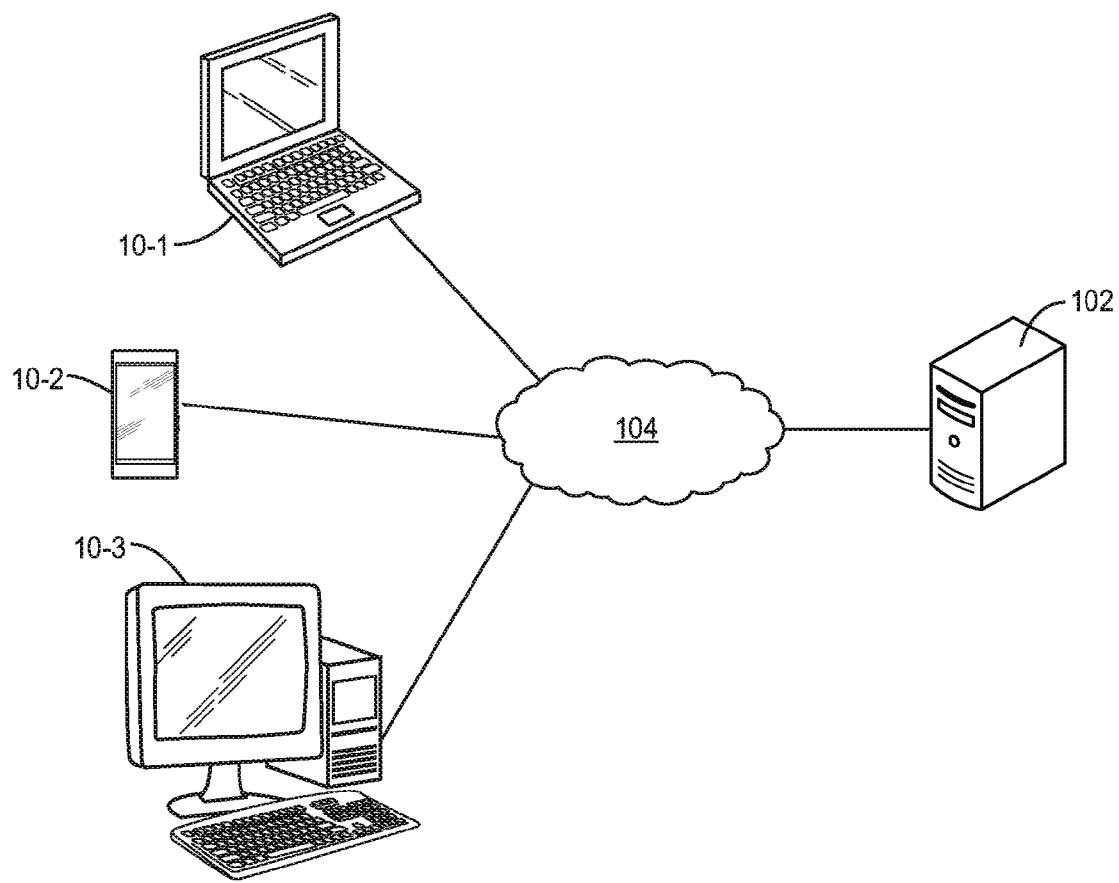
FIG. 19 is a network diagram for use by a picture password proof of knowledge authentication system according to some embodiments of the present disclosure.

FIG. 19 is a network diagram for use by a picture password proof of knowledge authentication system according to some embodiments of the present disclosure. As shown, electronic devices 10-1, 10-2, and 10-3 communicate with a server 102 over a network 104. In some embodiments, the network 104 is a Local Area Network (LAN), a Wide Area Network (WAN) such as the Internet, or combinations thereof. In some embodiments, the server 102 is one or more web servers that are remote from the electronic devices 10-1, 10-2, and 10-3. In some embodiments, the picture password proof of knowledge authentication system is formed from a combination of one or more servers 102 and/or one or more electronic devices 10. For example, the server 102 may provide one or more images to the electronic devices 10-1, 10-2, and 10-3 for use prior to or during entry of a picture password proof of knowledge according to the embodiments detailed above.

In some embodiments, a computer program including instructions which, when executed by at least one processor, causes the at least one processor to carry out the functionality of the electronic device 10 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 76).

Embodiments include methods of providing a picture password proof of knowledge substantially as shown and described. Embodiments also include systems of providing a picture password proof of knowledge substantially as shown and described.

Some embodiments include a method of providing a picture password proof of knowledge, said method comprising displaying an image on a display, operatively associating a grid having a plurality of elements with said image, inputting with a processor a touch action or a click action corresponding to a first one of said plurality of elements and responsively highlighting a different second one of said plurality of elements on said display that is offset from said first one of said plurality of elements, and successively including with said touch action or said click action: (i) a first state for changing the first one of said plurality of elements on said display without causing a drag path, (ii) a second state, after said touch action or said click action, for selecting the first one of said plurality of elements for a predetermined duration, and accepting input to establish a drag path on said display by another touch action or another click action, and (iii) a third state, after said predetermined duration, for accepting input to select another one of said plurality of elements on said display.

In some embodiments, the methods include displaying said grid on said display. In some embodiments, the methods include not displaying said grid on said display.

In some embodiments, the methods include employing as said display a smart phone display or a touch display screen.

In some embodiments, the methods include offsetting said different second one of said plurality of elements in a direction with respect to said first one of said plurality of elements, and employing said direction selected from a group consisting of left, right, up, down, left and up, left and down, right and up, and right and down.

In some embodiments, the method does not require any pan or zoom of the displayed image on said display.

In some embodiments, the methods include employing two different sizes of said grid, and selecting one of the two different sizes when creating an account for a user.

In some embodiments, the methods include employing a mode where said offset is zero and said three states are disabled, and enabling said mode by a number of a user action, a detected size of said display, and a policy setting.

In some embodiments, the methods include employing a timer having an inactive state and an active state, and for the first state (Touch: Down), if the timer has the active state, then highlighting an end point on said display, or if the timer has the inactive state, then highlighting a start point on said display.

In some embodiments, the methods include, for the first state (Touch: Move), if the start point is highlighted on said display, then moving the highlighted start point on said display, or for the second state, if the start point is not highlighted on said display, then highlighting an end point on said display and drawing a line between the start point on said display and the highlighted end point on said display.

In some embodiments, the methods include, for the first state (Touch: Up), if the start point is highlighted on said display, then enabling the active state of the timer, or for the second state, if the start point is not highlighted on said display, then highlighting an end point on said display and drawing a line between the start point on said display and the highlighted end point on said display.

In some embodiments, the methods include, for the third state, if the timer having the active state expires, then displaying a single one of said plurality of elements on said display.

In some embodiments, the methods include, employing with said displayed image on said display a plurality of layers, and employing a number of drag paths on each of a plurality of said plurality of layers.

In some embodiments, the methods include, employing a first one of said number of drag paths on a first one of said plurality of layers, employing a different second one of said number of drag paths on a different second one of said plurality of layers, and avoiding intersection of said first one of said number of drag paths with said different second one of said number of drag paths.

In some embodiments, the methods include employing a first one of said number of drag paths on one of said plurality of layers, employing a different second one of said number of drag paths on said one of said plurality of layers, and accepting input to cause said first one of said number of drag paths to jump over said different second one of said number of drag paths.

In some embodiments, the methods include accepting input to select the image displayed on said display from a plurality of different images of a web server.

In some embodiments, the methods include employing as the image displayed on said display a first image; inputting a different second image including a plurality of different objects, persons, or animals; predefining a textual hint and an action operatively associated with the different second image; displaying the textual hint and the different second image on said display; accepting input related to the action operatively associated with the different second image; and verifying said accepted input and said action operatively associated with the different second image before enabling input of said picture password proof of knowledge.

In some embodiments, the methods include employing as the image displayed on said display a first image; inputting a different second image including a plurality of different objects, persons, or animals; predefining a plurality of different textual hints and a corresponding plurality of different actions operatively associated with the different second image; selecting and displaying one of the different textual hints and the different second image on said display; accepting input related to one of said corresponding plurality of different actions corresponding to the selected and displayed one of the different textual hints; and verifying said accepted input and said one of said corresponding plurality of different actions corresponding to the selected and displayed one of the different textual hints before enabling input of said picture password proof of knowledge.

In some embodiments, the methods include employing as the image displayed on said display a first image, displaying a plurality of different second images on said display, each of said different second images belonging to one of a plurality of separate and perceptibly distinct classes, displaying a different third image on said display belonging to one of said separate and perceptibly distinct classes, accepting input to select one of said different second images belonging to said one of said separate and perceptibly distinct classes, and verifying that said accepted input selected said one of said different second images belonging to said one of said separate and perceptibly distinct classes before enabling input of said picture password proof of knowledge.

In some embodiments, the methods include employing as the image displayed on said display a first image; displaying a different second image on said display including a plurality of different objects, persons, or animals; displaying a predefined a textual analogy on said display corresponding to a predefined one of the plurality of different objects, persons, or animals of the different second image; accepting input to select one of the plurality of different objects, persons, or animals of the different second image; and verifying said accepted input selected said predefined one of the plurality of different objects, persons, or animals of the different second image before enabling input of said picture password proof of knowledge.

Figure 20:
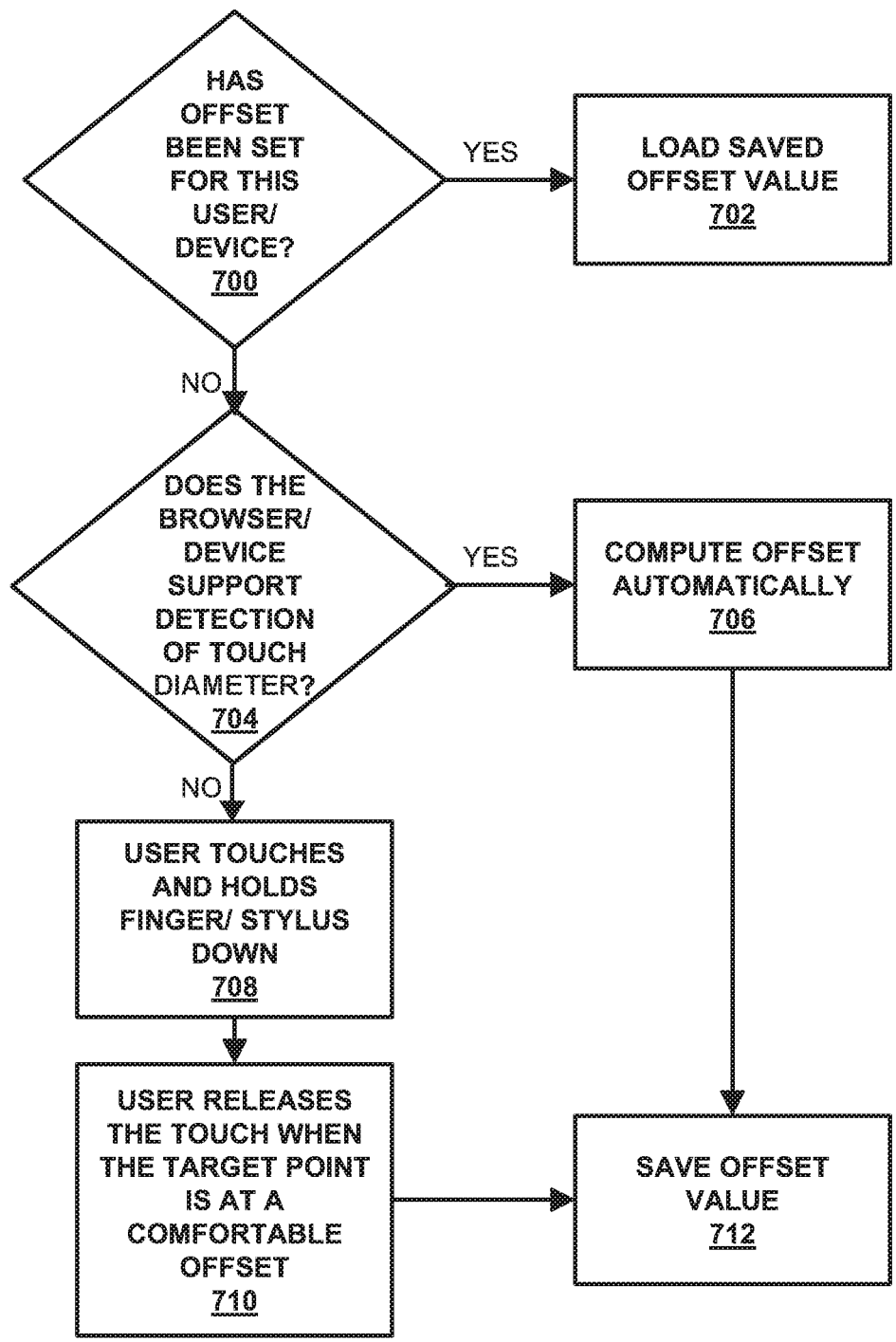
FIG. 20 is a flowchart illustrating the determination of an offset value according to some embodiments of the present disclosure.

In many of the embodiments discussed above, the offset was predetermined and in some embodiments is set based on the size of the display, a policy setting, whether or not the display is a touch-sensitive display, and/or whether or not the device is a mobile device. There may be some instances where the offset value can be set for a specific user or device. This may provide additional customization and flexibility for the user when attempting to remove the obscurity of the target points. FIG. 20 is a flowchart illustrating the determination of an offset value according to some embodiments of the present disclosure. First, it is determined whether or not an offset has been set for this user and/or device (step 700). For example, the offset value may have been stored as a cookie on the device or on any one of the related servers. If the offset has been set, the saved offset value should be loaded (step 702). This offset can be used in any of the previously discussed embodiments where the offset was predetermined. If the offset has not been set or if the saved offset value should be changed or updated for any reason, it is determined if the browser and or device supports detection of touch diameter (step 704). For example, in JavaScript, the diameter of a touch can be given and an offset can be computed automatically. But, this advanced feature may not be implemented on every device or system. If the browser and/or device does support detection of touch diameter, the offset can be computed automatically (step 706). In some embodiments, the offset is set to the half of the diameter of the detected touch so that the chosen point is on the edge of the size of the detected touch. In other embodiments, the offset is computed to be a larger value based on the diameter and the size of the display, a policy setting, and/or whether or not the device is a mobile device.

If the browser and/or device does not support detection of touch diameter or if it is otherwise determined to use a different method of determining the offset, a more general method would be for the user to be invited to simply touch and hold his/her finger (or stylus) down (step 708). While the finger or stylus is held down, the target point is shown moving away from the actual location. Then the user releases the touch when the target point is a comfortable distance offset from the actual location of touch (step 710). In this way any display and any client can be trained to provide the correct offset for that user and/or device. If the offset is determined automatically as in step 706 or if the offset is determined by the user as in steps 708 through 710, the offset value may be saved for future use (step 712). This may be stored as a cookie on the client device or can be saved server side as well using the well-known technique of server side cookies. In some embodiments, the offset value is saved for the specific client device. In other embodiments, the offset value is stored for the specific user and may also be tied to the specific client device.

While specific embodiments of the disclosed concept have been described in detail, it will be appreciated by those skilled in the art that various modifications and alternatives to those details could be developed in light of the overall teachings of the disclosure. For example, the any of the aforementioned verifications may occur locally at the electronic device 10 or at the server 102 over the network 104. Accordingly, the particular arrangements disclosed are meant to be illustrative only and not limiting as to the scope of the disclosed concept which is to be given the full breadth of the claims appended and any and all equivalents thereof.

Those skilled in the art will recognize improvements and modifications to the preferred embodiments of the present disclosure. All such improvements and modifications are considered within the scope of the concepts disclosed herein and the claims that follow.

What is claimed is:

1. A portable device, comprising:
    a small display;
    an input subsystem, wherein the input subsystem comprises a touch sensitive display;
    one or more processors; and
    memory containing instructions executable by the one or more processors whereby the portable device is operable to:
        display, on the small display of the portable device, a first image, wherein the first image is associated with an overlaid grid comprising a plurality of elements and each element corresponds to a distinct area of the first image;
        determine an offset to be used; and
        in response to receiving an input via the input subsystem at a first location on the small display, highlight an element of the overlaid grid at a second location on the first image on the small display, wherein the second location is offset from the first location by the offset.

2. The portable device of claim 1, wherein the offset is determined based on at least one member of the group consisting of: a saved offset value, a detected touch diameter, a mode of operation of the portable device, a size of the small display, a policy setting.

3. The portable device of claim 1, wherein the portable device is further operable to:
    receive a training input via the input subsystem at a first training location on the first image on the small display;
    continually change a highlighted element of the overlaid grid until the training input is concluded where the highlighted element is at a second training location on the first image on the small display; and
    set the offset to be the difference between the first training location and the second training location.

4. The portable device of claim 1, wherein the portable device is at least one member of the group consisting of: a smartphone, a media player, a tablet, a wearable, and a smartwatch.

5. The portable device of claim 1, wherein the portable device is further operable to display, on the small display of the portable device, the overlaid grid comprising the plurality of elements based on a visibility setting.

6. The portable device of claim 1, wherein the portable device is further operable to:
    display, on the small display, a whitespace area along at least one outside edge of the displayed image, wherein the whitespace does not include the displayed image.

7. The portable device of claim 6, wherein the whitespace contains at least one member of the group consisting of: graphical objects and graphical information.

8. The portable device of claim 7, wherein the graphical objects comprise controls for toggling a visibility setting of the overlaid grid.

9. The portable device of claim 7, wherein the graphical information comprises advertisements.

10. The portable device of claim 6, wherein the first location on the small display is at least one member of the group consisting of: a location within the first image and a location within the whitespace.

11. The portable device of claim 1, wherein the portable device further comprises a clock subsystem that controls a predetermined timer.

12. The portable device of claim 11, wherein a state of the predetermined timer is either active or not active based on the input.

13. The portable device of claim 12, wherein the input is at least one member of the group consisting of: a touch input and a hover input.

14. The portable device of claim 13, wherein the input is selected from a group consisting of a down input, a move input, and an up input.

15. The portable device of claim 14, wherein, if the input is the down input, the portable device is further operable to:
    determine the state of the predetermined timer;
    responsive to the state of predetermined timer being active, designate the element of the overlaid grid at the second location as a prospective end-point for an input action and display, on the small display, a line between a start-point of the input action and the prospective end-point for the input action; and
    responsive to the state of the predetermined timer being not active, designate the element of the overlaid grid at the second location as a prospective start-point for the input action.

16. The portable device of claim 14, wherein, if the input is the move input, the portable device is further operable to:
    determine a designation of the element of the overlaid grid at the second location on the first image;
    responsive to the designation of the element of the overlaid grid at the second location on the first image as a prospective start-point for an input action, move the prospective start-point in accordance with the move input; and
    responsive to the designation of the element of the overlaid grid at the second location on the first image as a prospective end-point for the input action, move the prospective end-point in accordance with the move input and move, on the small display, a line between a start-point for the input action and the prospective end-point in accordance with the move input.

17. The portable device of claim 14, wherein, if the input is the up input, the portable device is further operable to:
    determine a designation of the element of the overlaid grid at the second location on the first image;
    responsive to the designation of the element of the overlaid grid at the second location on the first image being a prospective start-point for the input action, set the element of the overlaid grid at the second location as a start-point for the input action, and activate the predetermined timer; and
    responsive to the designation of the element of the overlaid grid at the second location on the first image being a prospective end-point for the input action, set the element of the overlaid grid at the second location as an end-point for the input action and display, on the small display, a line between the start-point and the end-point for the input action.

18. The portable device of claim 1, wherein the portable device is further operable to:

receive a grid size input that designates a size of the overlaid grid comprising the plurality of elements from a plurality of different grid sizes, wherein the overlaid grid comprising the plurality of elements supports the plurality of different grid sizes.

19. The portable device of claim 18, wherein the grid size input is at least one member of the group consisting of: the input from the input subsystem and an input received via the communications interface.

20. The portable device of claim 1, wherein the input subsystem comprises a first input subsystem for determining a first type of input as a touch input and a second input subsystem for determining a second type of input is a hover input.

21. The portable device of claim 20, wherein the portable device further comprises a plurality of input layers, and the portable device is further operable to:
determine a type for the input;
responsive to the type for the input being a first type, detect the input on a first layer of the plurality of input layers; and
responsive to the type for the input being a second type of input, detect the input on a second layer of the plurality of input layers.

22. The portable device of claim 21, wherein the determination of the type of input is based on at least one member of the group consisting of: a touch-and-hold gesture at a predetermined corner of the touch sensitive display, activation of a hot key, use of touch points, use of strokes, use of paths, a predetermined gesture that applies force on the touch sensitive display that exceeds a predetermined threshold, a predetermined gesture that does not contact the touch sensitive display.

23. The portable device of claim 1, wherein prior to the display of the first image, the portable device is further operable to:
display, on the small display of the portable device, one or more second images associated with a predetermined textual hint and a predetermined input action;
display, on the small display of the portable device, the predetermined textual hint;
detect an input action with respect to the one or more second images; and
provide access to the first image based on a verification that the input action with respect to the one or more second images corresponds to the predetermined input action.

24. The portable device of claim 1, wherein prior to the display of the first image, the portable device is further operable to:
display, on the small display of the portable device, one or more second images comprising a plurality of objects, wherein each of the plurality of objects is associated with class designation information indicative of one of at least two separate and perceptibly distinct classes;
highlight a first object from the plurality of objects, the first object having a first class designation information;
receive an input identifying a second object from the plurality of objects, the second object having a second class designation information; and
provide access to the first image based on a verification that the first and second class designation information is the same.

25. The portable device of claim 1, wherein prior to the display of the first image, the portable device is further operable to:
display, on the small display of the portable device, one or more second images comprising a plurality of objects;
display, on the small display of the portable device, a predetermined textual analogy;
highlight an object from the plurality of objects;
receive an input identifying a second object from the plurality of objects; and
provide access to the first image based on a verification that the second object identified satisfies the predetermined textual analogy with respect to the first object highlighted.

* * * * *